United States Patent
Coon et al.

(10) Patent No.: US 8,592,329 B2
(45) Date of Patent: Nov. 26, 2013

(54) VIBRATIONALLY COMPRESSED GLASS FIBER AND/OR OTHER MATERIAL FIBER MATS AND METHODS FOR MAKING THE SAME

(75) Inventors: Larry K. Coon, Albany, OR (US); George Zguris, Canterbury, NH (US); Patrick Svoboda, Philomath, OR (US)

(73) Assignee: Hollingsworth & Vose Company, East Walpole, MA (US)

( * ) Notice: Subject to any disclaimer, the term of this patent is extended or adjusted under 35 U.S.C. 154(b) by 1415 days.

(21) Appl. No.: 10/960,628

(22) Filed: Oct. 6, 2004

(65) Prior Publication Data

US 2005/0075030 A1   Apr. 7, 2005

Related U.S. Application Data

(60) Provisional application No. 60/509,328, filed on Oct. 7, 2003.

(51) Int. Cl.
*D04H 1/56* (2006.01)

(52) U.S. Cl.
USPC ........... 442/400; 442/327; 442/401; 442/414; 442/415; 442/416

(58) Field of Classification Search
USPC .................. 442/327, 414, 400, 401, 415, 416
See application file for complete search history.

(56) References Cited

U.S. PATENT DOCUMENTS

| | | | |
|---|---|---|---|
| 2,117,371 A | 5/1938 | Slayter | |
| 2,311,613 A | 2/1943 | Slayter | |
| 2,339,431 A | 1/1944 | Slayter | |
| 2,477,000 A | 7/1949 | Osborne | |
| 2,484,787 A | 10/1949 | Grant | |
| 2,734,095 A | 2/1956 | Mears et al. | |
| 3,085,126 A | 4/1963 | Labino | |
| 3,338,777 A | 8/1967 | Irwin et al. | |
| 3,540,190 A * | 11/1970 | Brink, Jr. ........................ 95/278 |

(Continued)

FOREIGN PATENT DOCUMENTS

| EP | 0 421 375 | 4/1991 |
|---|---|---|
| EP | 0 910 130 A1 | 4/1999 |

(Continued)

OTHER PUBLICATIONS

"Chemical bond." The American Heritage Dictionary of the English Language, Fourth Edition. Houghton Mifflin Company, 2004.*

(Continued)

*Primary Examiner* — Andrew Piziali
(74) *Attorney, Agent, or Firm* — Choate, Hall & Stewart LLP

(57) ABSTRACT

Methods for enhancing one or more physical properties of wet-laid or dry-laid fiber mats, such as a glass fiber, cellulosic or polymeric fiber mats are disclosed and fiber mats made according to such processes. Certain embodiments of the methods involve vibrational compression of a wet-laid or dry-laid fiber mat. In some embodiments the methods produce a fiber mat having increased apparent density and/or tensile strength as compared to a mat that has not been vibrationally compressed. Exemplar fiber mats suitable for use in the disclosed methods include, for example, glass, polyolefin, ethylene terephthalate, or cellulose fibers, or mixtures thereof. Glass, cellulosic or polymeric fiber mats that are structurally improved by the disclosed methods are also disclosed.

20 Claims, 12 Drawing Sheets

(56) References Cited

U.S. PATENT DOCUMENTS

| | | | |
|---|---|---|---|
| 3,608,166 A | | 9/1971 | Gruget |
| 3,698,562 A | * | 10/1972 | Farrow et al. ............... 210/488 |
| 3,745,748 A | * | 7/1973 | Goldfield et al. ............. 95/273 |
| 3,857,732 A | * | 12/1974 | Yoshino ................... 427/389.9 |
| 3,908,808 A | | 9/1975 | Busker |
| 3,944,650 A | * | 3/1976 | Hirota et al. ............. 423/243.08 |
| 3,967,417 A | | 7/1976 | Jurak |
| 3,989,545 A | | 11/1976 | Ito et al. |
| 4,205,122 A | | 5/1980 | Miura et al. |
| 4,216,280 A | | 8/1980 | Kono et al. |
| 4,216,281 A | | 8/1980 | O'Rell et al. |
| 4,231,768 A | * | 11/1980 | Seibert et al. ................. 96/128 |
| 4,245,013 A | | 1/1981 | Clegg et al. |
| 4,336,314 A | | 6/1982 | Yonnezu et al. |
| 4,359,511 A | | 11/1982 | Strzempko |
| 4,363,856 A | | 12/1982 | Waterhouse |
| 4,367,271 A | | 1/1983 | Hasegawa et al. |
| 4,373,015 A | | 2/1983 | Peters et al. |
| 4,387,144 A | | 6/1983 | McCallum et al. |
| 4,429,442 A | | 2/1984 | Thomas |
| 4,465,748 A | | 8/1984 | Harris |
| 4,522,876 A | | 6/1985 | Hiers |
| 4,529,677 A | | 7/1985 | Bodendorf |
| 4,648,177 A | | 3/1987 | Uba et al. |
| 4,908,282 A | | 3/1990 | Badger |
| 5,009,971 A | | 4/1991 | Johnson et al. |
| 5,075,184 A | | 12/1991 | Tanaka et al. |
| 5,076,826 A | | 12/1991 | Teeter |
| 5,091,275 A | | 2/1992 | Brecht et al. |
| 5,180,647 A | | 1/1993 | Rowland et al. |
| 5,330,816 A | * | 7/1994 | Rusek, Jr. ....................... 428/69 |
| 5,336,275 A | | 8/1994 | Zguris et al. |
| 5,468,572 A | | 11/1995 | Zguris et al. |
| 5,609,934 A | * | 3/1997 | Fay ................................. 428/74 |
| 5,633,077 A | * | 5/1997 | Olinger ......................... 442/131 |
| 5,900,206 A | | 5/1999 | Pellegrin et al. |
| 6,071,641 A | | 6/2000 | Zguris |
| 6,071,651 A | | 6/2000 | Forte et al. |
| 6,095,023 A | | 8/2000 | Harada et al. |
| 6,108,879 A | | 8/2000 | Forte et al. |
| 6,143,441 A | | 11/2000 | Zguris et al. |
| 6,227,009 B1 | | 5/2001 | Cusick et al. |
| 6,247,475 B1 | | 6/2001 | Sato |
| 6,306,539 B1 | | 10/2001 | Zguris |
| 6,384,100 B1 | | 5/2002 | Choi |
| 6,432,482 B1 | | 8/2002 | Jaffee et al. |
| 6,495,286 B2 | | 12/2002 | Zguris et al. |
| 6,531,248 B1 | | 3/2003 | Zguris et al. |
| 6,583,075 B1 | | 6/2003 | Dugan |
| 6,866,693 B2 | * | 3/2005 | Igarashi ...................... 55/385.3 |
| 2003/0003298 A1 | | 1/2003 | Kruszewski |
| 2003/0008214 A1 | | 1/2003 | Zguris |
| 2003/0035998 A1 | | 2/2003 | Zguris et al. |
| 2003/0044683 A1 | | 3/2003 | Zguris et al. |
| 2003/0180534 A1 | | 9/2003 | Zguris et al. |
| 2005/0130031 A1 | | 6/2005 | Zguris |

FOREIGN PATENT DOCUMENTS

| | | |
|---|---|---|
| EP | 1 010 673 A2 | 6/2000 |
| EP | 1 010 673 A3 | 12/2000 |
| EP | 1 447 213 | 8/2004 |
| EP | 0 949 705 | 11/2006 |
| JP | 55053065 | 4/1980 |
| JP | 55091564 | 7/1980 |
| JP | 55146872 | 11/1980 |
| JP | 2-182450 | 7/1990 |
| JP | 4-179542 | 6/1992 |
| JP | 05-148721 | 6/1993 |
| JP | 07-147154 | 6/1995 |
| JP | 09-92252 A | 4/1997 |
| TW | 435470 | 5/2001 |
| TW | 436535 | 5/2001 |
| TW | 288060 | 10/2007 |
| WO | WO81/01076 | 4/1981 |
| WO | 97/34845 | 9/1997 |
| WO | WO98/12759 | 3/1998 |
| WO | 98/45519 | 10/1998 |
| WO | 2004/046443 | 6/2004 |

OTHER PUBLICATIONS

Definition "mat" 2010 Merriam-Webster, Inc. http://www.merriam-webster.com/dictionary/mat.*
Engineered Materials Handbook, Ceramics and Glasses, vol. 4, Section 6, pp. 402-408 (ASM International) (1991).
European Search Report (EPC No. 05021802.3).
English-language Translation of Office Action for Taiwanese Patent Application No. 094126558, filed Aug. 4, 2005 (Mailed Jan. 3, 2008).
Taiwanese Search Report for Taiwanese Patent Application No. 096105347, filed Aug. 4, 2005 (date of completion Dec. 31, 2007).
English translation of Notice of Reasons for Rejection for Japanese Patent Application No. 2005-200182 (mailed May 26, 2008).
Computer translation into English of JP 05-148721.
English laguage Abstract of JP 05-148721.
English translation of Notice of Reasons for Rejection for Japanese Patent Application No. 2005-200182 (mailed Nov. 26, 2009).

* cited by examiner

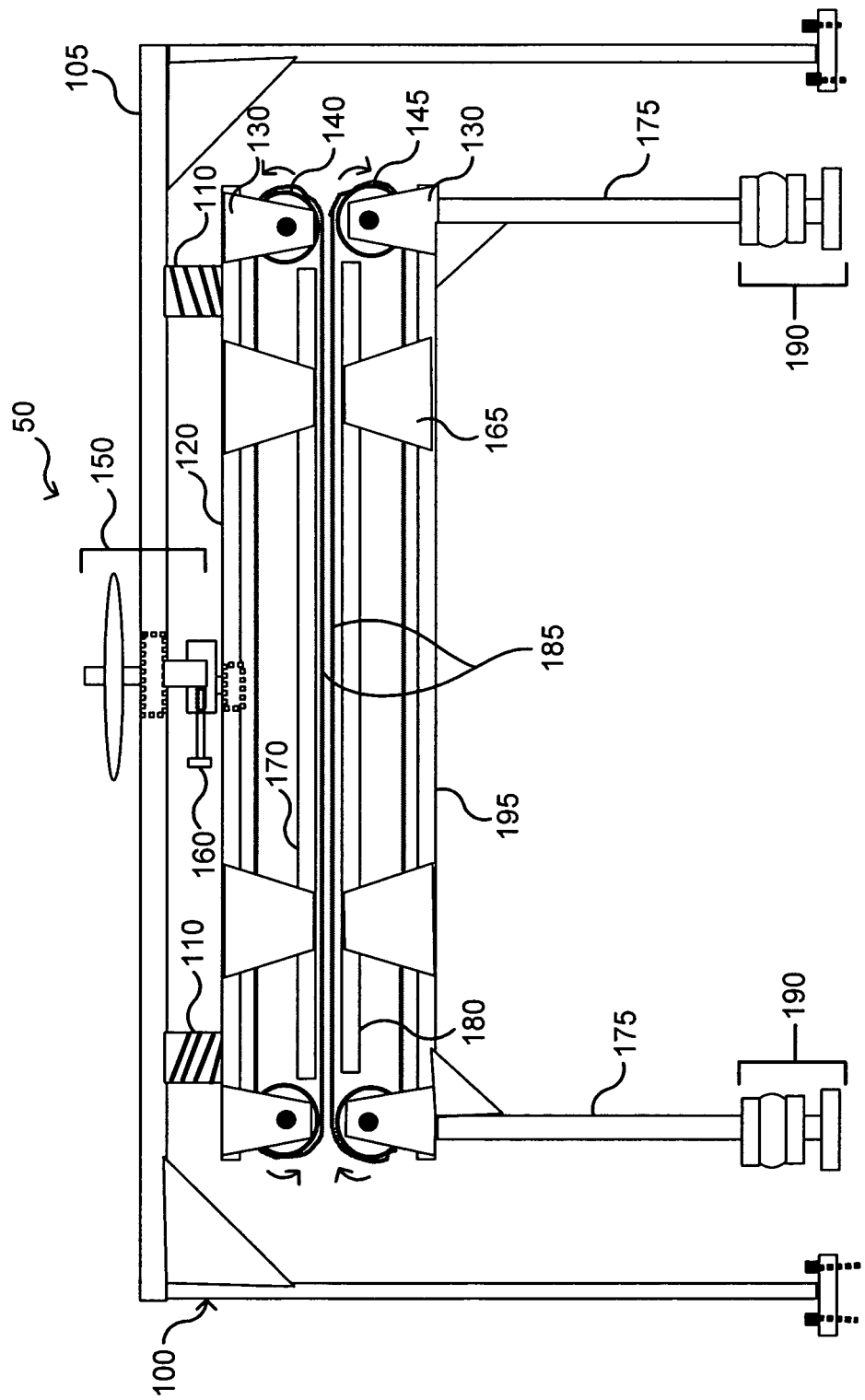

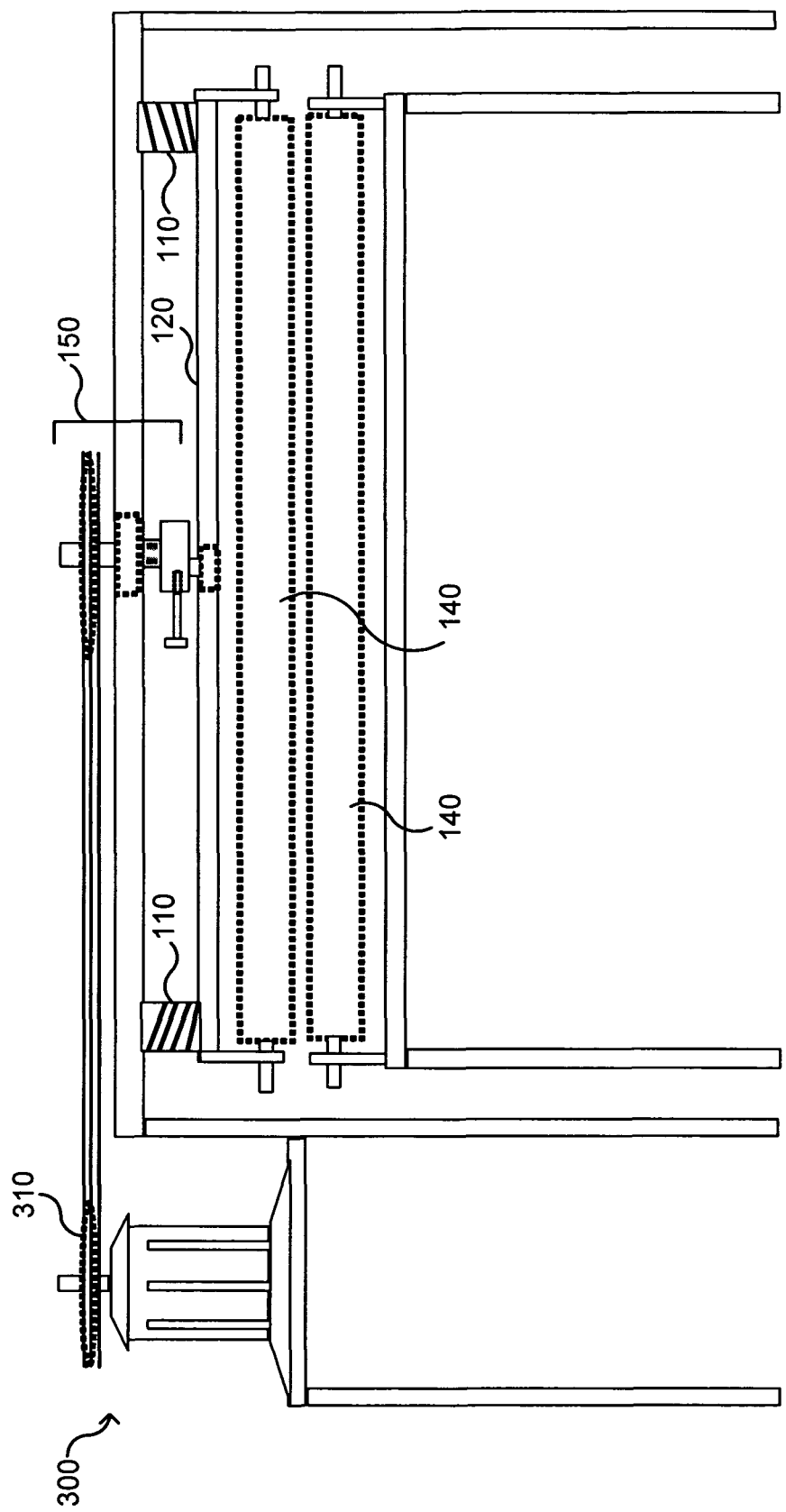

VIBRATIONALLY COMPRESSED GLASS FIBER AND/OR OTHER MATERIAL FIBER MATS AND METHODS FOR MAKING THE SAME

CROSS-REFERENCE TO RELATED APPLICATIONS

This application claims the benefit of U.S. Provisional Patent Application No. 60/509,328, filed Oct. 7, 2003, incorporated herein in its entirety.

FIELD

This disclosure relates to vibrationally compressed mats of glass fibers and/or other material fibers and methods of making the same.

BACKGROUND

Glass fiber (and/or other fiber material such as polymeric fibers or cellulosic fibers) mats have a variety of uses, for example, as liquid or air filtration, battery separators, thermal insulation, cryogenic insulation, and electrical insulation. Glass fiber mats may be produced from glass fibers (or glass fiber strands). The production of glass fiber strands from molten glass typically involves attenuating fibers from small orifices in an apparatus that is operably linked to a glass-melting furnace. The extruded glass fibers are made into the desired diameter and length (often by mechanical means) and are collected or directly processed into mats.

Dry-laid and wet-laid processes are methods for producing glass fiber mats from glass fibers. Typically, in a dry-laid process, glass fibers are chopped and air blown onto a conveyor. In some applications, a binder is then applied to form a mat. Traditional dry-laid processes are particularly suitable for the production of highly porous (e.g., low density) mats having bundles of glass fibers. In a wet-laid process, glass fibers are dispersed in an aqueous solution, which may contain dispersants, viscosity modifiers, defoaming agents or other chemical agents. A slurry of suspended fibers or a mixture of fibers and particulates, i.e., fillers, is deposited onto a moving screen or cylinder where water is removed (usually by suction or vacuum devices). In some instances, a polymeric or inorganic binder is added for further sheet enhancement, by way of, e.g., a beater-add-processor or the binder can be applied after a sheet is semi-formed or fully formed by way of a spray, curtain coater, size press or other means know to those of ordinary skill in the art. This addition may be followed by vacuum liquid removal and/or drying by application of heat in the form of radiate, convection or conduction sources.

In an example of a dry-laid process, glass fibers mats are produced by a rotary cat process, wherein for example, small diameter streams of molten glass are caused to flow from a melting tank, and the streams are accelerated longitudinally to cause attenuation to a desired fiber diameter. The attenuated fibers are collected on a conveyor as a mat in which the individual fibers are intermeshed and randomly oriented. Such mats typically have a density, when under no load (i.e., no or substantially no external force on the mats—a load or external force of about 10 kPa or less), of from about 5.0 to about 50 kg/m$^3$. A mat density in this range is unsuitably low for some commercial applications (such as battery separators, certain filter media, or certain insulation applications).

Certain dry-laid fiber mats have achieved higher densities by utilizing hydro-entanglement techniques (e.g., where a high-velocity jet stream of water penetrates the mat orienting a portion of the fibers in the stream's path in its direction to further entangling the mat) or other fiber mat wetting processes wherein the mat is wetted with a liquid and then compressed, the liquid in the mat suppressing the natural resiliency of the mat. However, hydro-entanglement requires the fibers penetrated by the water (and other wet methods require the mat) then be dried on an apparatus similar to what is necessary for a wet-laid fiber mat (i.e., requires a drying screen or the like). See, e.g., PCT/US97/17187, WO 98/12759. The wetting/liquid addition to the mat approach to increase density of a dry-laid fiber mat likewise requires additional equipment for adding the liquid and requires the liquid remain present in the compressed fiber mat to continue suppression of the fiber mat's natural resiliency (i.e., liquid must remain to keep the fiber mat density relatively high). See, e.g., U.S. Pat. No. 5,468,572. Some dry-laid mats have been subjected to needle-punching in attempt to increase densities. However, needle-punching alone is not sufficient to achieve the densities desired in a dry-laid fiber mat and such treatment adds holes to the mat and requires further equipment/steps for processing the mat product.

Although wet-laid fiber mats may meet such density requirements, the wet-laid process is more expensive and requires additional steps that often destroy the fiber's properties. In addition, dry-laid fiber mats are not subjected to degradation from pulping, pumping, cleaning, chemical additives, and/or pressure damage to which wet-laid fiber mats are subjected. Thus, it is desirable to increase the density of bonded or unbonded, dry-laid glass fiber mats to make such mats suitable for an expanded number of uses. Likewise, it would be useful to have dry-laid fiber mats with densities previously only achieved using wet-laid processes, or by including binders with dry-laid fiber mats, by adding liquids to dry-laid fiber mats, or by treating dry-laid fiber mats with hydro-entanglement and/or needle-punching steps. Accordingly, methods of enhancing the physical properties (such as, density, thickness, compression resiliency and/or tensile strength) of dry-laid fiber mats (and wet-laid fiber mats in certain circumstances) are needed. In addition, dry-laid fiber mats wherein relatively high density values are achieved without the need for needle-punching, hydro-entanglement, and/or wetting with a liquid to achieve such densities are desirable.

SUMMARY

Disclosed are embodiments of dry-laid fiber mats comprising entangled glass fibers (or other fibers or mixtures of glass fibers with different types of fibers) having an average diameter of, e.g., from about 0.2 μm to about 30 μm, wherein the dry-laid fiber mat is substantially binder free, has a density of least about 60 kg/m$^3$ absent a substantial external force, and wherein the fiber mat has not been hydro-entangled or needle-punched. In certain embodiments the dry-laid fiber mat has densities, absent a substantial external force, of at least about 120 kg/m$^3$, at least about 175 kg/m$^3$, at least about 200 kg/m$^3$, or higher. Such relatively high density fiber mats are formed utilizing the disclosed vibration compression methods. In certain embodiments, the dry-laid fiber mats are orbitally vibrationally compressed to reach higher density values.

Also disclosed are methods for increasing the density of a mat of intermeshed fibers having diameters of, e.g., from about 0.2 to 50 μm, wherein the method includes forming a dry-laid fiber mat and vibrating the fiber mat such that the extent of intermeshing of the fibers and density of the mat are increased. In certain embodiments, the dry-laid fiber mat is orbitally vibrationally compressed to reach higher density values. In other embodiments, wet-laid fiber mats are vibrationally compressed to increase the density of the mats without substantial fiber breakage.

BRIEF DESCRIPTION OF THE FIGURES

FIGS. 12A-C are schematic representations of one embodiment of a vibration compression apparatus. FIGS. 12A and 12B are views from respective parallel sides of the apparatus; FIG. 12C is an end view perpendicular to the view shown in FIGS. 12A and B.

FIG. 13A is a roller drive motor assembly; FIG. 13B is a roller support assembly; and FIG. 13C are two vertically opposed roller support assemblies.

DETAILED DESCRIPTION

I. Terms

Figure 1:
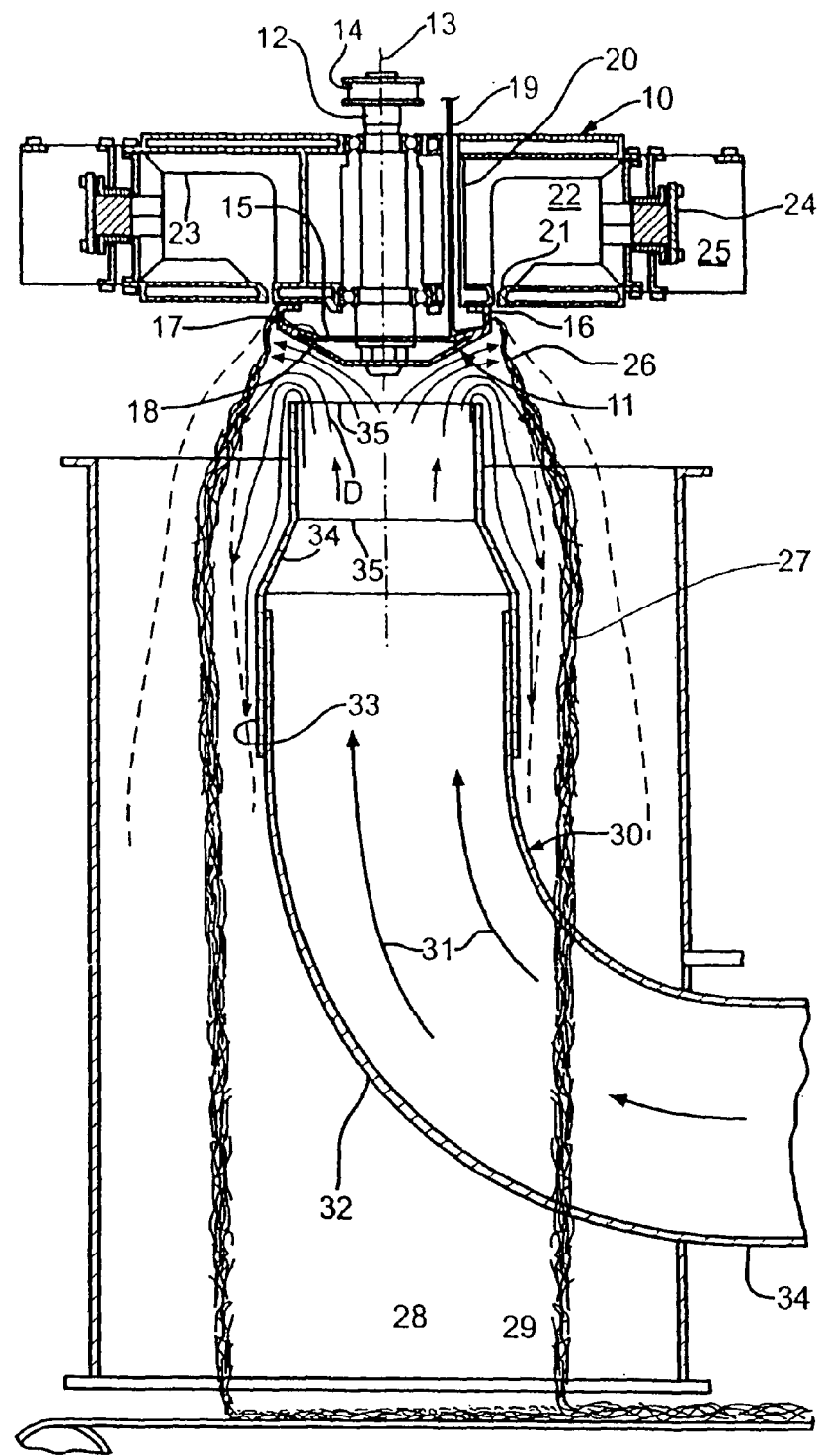
FIG. 1 is a partial schematic drawing of an apparatus for making dry-laid fibers suitable for vibration compression.

Unless otherwise noted, technical terms are used according to conventional usage. Definitions of common terms germane to this disclosure may be found in the *McGraw-Hill Dictionary of Scientific and Technical Terms*, Fifth ed. by Sybil P. Parker, Columbus, Ohio: McGraw Hill Education, 1994 and INDA Nonwovens Glossary, Cary, N.C., INDA, Association of the Nonwoven Fabrics Industry (2002). The singular terms "a," "an," and "the" include plural referents unless context clearly indicates otherwise. Similarly, the word "or" is intended to include "and" unless the context clearly indicates otherwise. "Comprising" means "including." Hence "comprising A or B" means "including A or B," or "including A and B." It is further to be understood that, unless context requires otherwise, all weight (or mass), volume, density, or distance measurements provided herein are approximate.

In order to facilitate review of the various embodiments disclosed herein, the following explanations of specific terms are provided.

Nonwoven fabrics: broadly defined as sheet or web structures held together (or bonded together) by entangling fibers or filaments (and by perforating films) mechanically, thermally or chemically. Nonwoven fabrics are flat, porous sheets that are made directly from separate fibers or from molten plastic or plastic film. Nonwoven fabrics are not made by weaving or knitting and do not require converting the fibers to yarn.

Basic Density: Based on Tappi Test Method T258, the ratio of the mass of a quantity of a substance to its volume expressed as weight per unit volume, such as $g/cm^3$, $kg/m^3$ in the absence or substantially (about 10 kPa or less) in the absence of an external force. Density of fiber mats is measured when the material is "dry" for the intended application. The density is then calculated as grams per cubic meter (or pounds per cubic foot). The thickness of a fiber mat is determined using a thickness gauge that applies a nominal force on the specimen (about 10 kPa or less) while using a presser foot with a diameter of 25.4 mm; this thickness is known as $T_{10}$ An alternate thickness measurement comprising a zero-load thickness, $T_z$, uses a Venier caliper gauge or calibrated scale Unless the context indicates otherwise, references herein to densities of fiber mats (comparative or otherwise) mean the density of the fiber mats under no or nominal, substantially identical, pressures (external force) because, as known to those of ordinary skill in the art, obtaining meaningful density measurements of fiber mats may require application of an insignificant amount of external force or pressure (10 kPa or less) on the mat.

Wet-laid: a nonwoven web forming process involving filtering an aqueous suspension of fiber on a screen conveyor belt or perforated drum.

Dry-laid: fibrous sheets, webs, or mats formed using a dry forming method in which fibers in a substantially dry state are formed into mats or webs and are bound together by fiber entanglement (and in certain embodiments including a binder).

Flexibility: Capable of being bent without breakage under conditions that would cause the breakage of other medias of like densities and thickness. (Such as compared to a wet-laid fiber mat having a thickness of about 6 mm, at a density of 100 Kg/m$^3$ and greater wherein such mats have a greater tendency to crack when bent or flexed 180°, such as when used as battery separators).

Grammage: The weight of a particular media expressed in grams per square meter (g/m$^2$) of the media.

Basic Weight: The weight of a particular media expressed in pounds per ream of the media. Both grammage and basic weight can be measured using TAPPI Test Method T410 OM 98 "Grammage of Paper and paperboard (weight per unit area)." TAPPI Test Methods are published by Tappi Press, Atlanta, Ga. 30348-5113, ISBN 0-89852-353-2.

Batteries: any electrochemical device that has at least two plates (surfaces) of opposing polarity and is capable of supplying an electron flow (current).

Substantially binder-free: means fiber mats in which the primary mechanism for holding the sheet or web together is the entanglement of individual fibers as opposed to an adhesive binder mechanism, such as that obtained by the addition of methyl cellulose to glass fibers. The phrase "substantially binder-free" is not meant to exclude fiber mats that include materials that contribute to some minor degree of ionic bonding, for example, glass fiber mats that contain sodium sulfate to suppress dendritic growth but that also contributes to minor ionic binding of the fibers; fibers in such a mat would still be bound together primarily by fiber entanglement and the mat would be substantially binder free.

Insulation board or insulation board material: A material (such as, foam, glass fiber, ceramic fiber, powder, strand boards, fiber wallboards, interior fiber boards) that combines strength with thermal- and/or sound-deadening properties to form a sufficiently rigid material. In some examples, the density of an insulation board can range from about 15 kg/m$^3$ to greater than about 250 kg/m$^3$. Other exemplar insulation board contains 100% glass fiber and is suitable for temperatures exceeding about 1000° C.

Intermeshing: The overlapping, entanglement, and/or tightness of fit, of fibers contained in a media.

Vibrational compression: Increasing the density of a fiber mat by means of mechanical manipulation to its surface in the presence of external pressure and/or contact, thereby causing the fibers within the mat to become intermeshed such that the density of the fiber mat is increased.

Percent recovery (or resiliency): The percent a media will recover to its original thickness ($T_{10}$) after being compressed by an external force and the external force is removed.

Mat Tensile strength: The breaking strength of 25 mm×150 mm sample of media. Mat tensile strength may be tested using a Thwing-Albert model QC-1000. A 25×150 mm sample is set in the instrument and the clamps are set to an initial test span of 10±0.05 cm. The cross head speed is set to 1 cm/minute. The specimen is aligned and clamped in an upper jaw and then in the lower jaw. The tensile strength value is displayed on the Thwing-Albert instrument as well as percent elongation.

Vibrational compression: Vibration compression of the fiber mat caused by contact with the fiber mat combined with movement of the mat. Vibrational compression may be combined with force compression wherein external force is applied to the fiber mat to aid in compression.

Orbital Vibrational compression: Vibration compression with the use of an external force or contact with the fiber mat that rotates in an orbital motion relative to the fiber mat.

All publications, patent applications, patents, and other references mentioned herein are incorporated by reference in their entirety. All values, such as number ranges, temperatures and the like, are approximate values whether the word "about" is recited or not, in the specification and the claims, unless the value is explicitly and unambiguously stated as not being an approximate value.

II. Vibrational Compression of Fiber Mats

Disclosed herein are methods of making a glass fiber mat (or other fiber material mat) by vibrationally compressing an initial mat made by known processes. In some examples, vibrational compression enhances at least one physical characteristic of the resulting glass fiber mat (such as, density or tensile strength) as compared to a mat produced in the same manner but without vibrational compression. For ease of discussion, the disclosure speaks primarily in terms of glass fibers; however, the presently disclosed vibration compression methods may be used to enhance the physical properties of a variety of fiber mat materials, such as polymeric fiber mats or glass fiber/polymeric fiber mixed mats or traditional paper and paperboard products or carded or meltblown nonwovens.

Figure 11A:
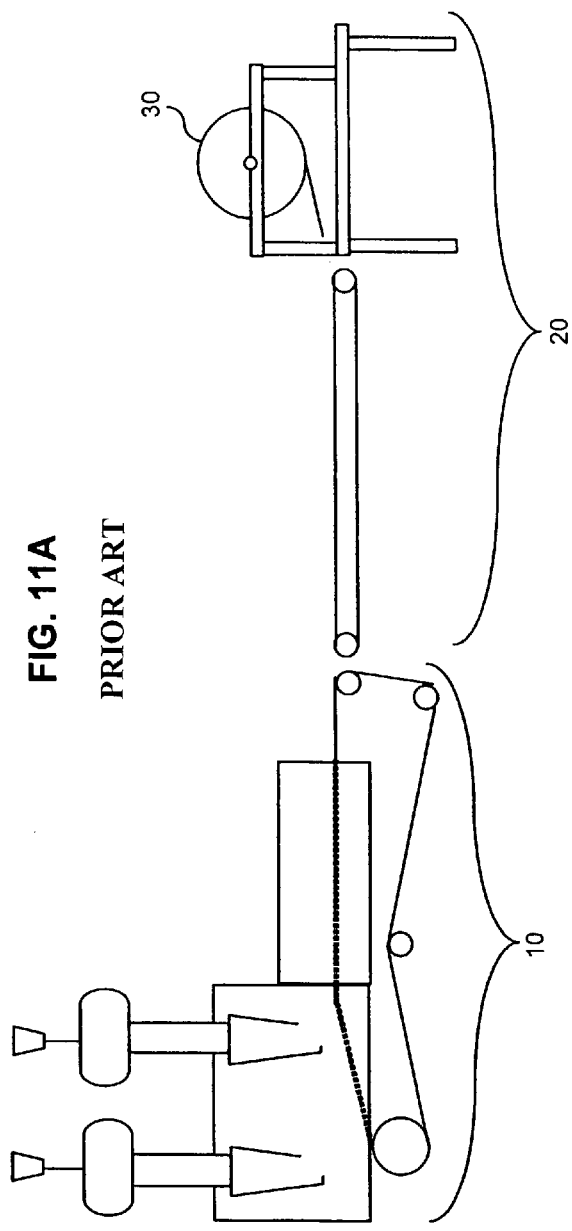
FIG. 11A is a schematic representation of an apparatus for making glass fibers and forming a layer of glass fibers or an uncompressed glass fiber mat.

An apparatus for making glass fibers and a glass fiber mat (prior to being vibrationally compressed) is shown in FIG. 11A. A glass mat assembly unit 10 produces an initial layer of glass fibers, or a "loose" glass fiber mat that may, optionally, be wound into a roll 30 using a wind-up assembly 20. A rolled glass mat 30 provides a convenient way to store or transport an uncompressed glass fiber mat. If an initial glass fiber mat is wound into a roll 30, an unwind assembly 40 can be used to unroll an initial glass-fiber mat and feed it into a vibrational compression assembly 50 (see FIG. 11B). An unwind assembly 40 may, optionally, include multiple rollers for controlling the grammage of the fiber mat by adding or subtracting fiber layers. In additional, the multiple rollers may be used for processing mats having fibers of different types and sizes. Further, scrim or mesh of various types can be added to increase strength/tensile of the fiber mat. A pre-compression roll is utilized in particular embodiments to lightly press the layers of fibers together and reduce the mat thickness (e.g., about 12 to 18 cms or down to about 10 cms) prior to processing of the fiber mat in a vibration compression assembly 50. In an alternative embodiment, the output from a glass mat assembly unit 10 can be input directly into the vibrational compression assembly 50 without an intervening wind-up assembly 20 or unwind assembly 40.

Figure 11B:
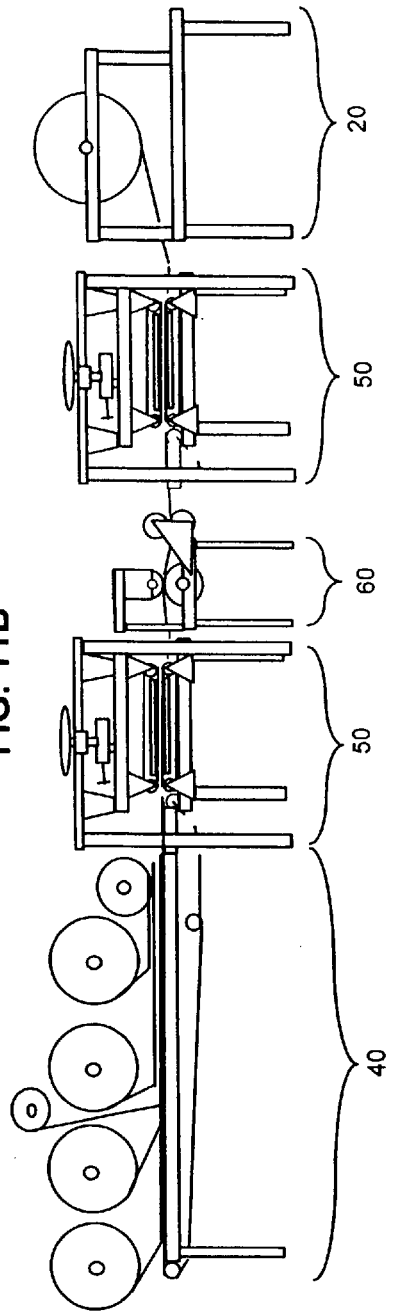
FIG. 11B is a schematic representation of an exemplar process for making a vibrationally compressed glass fiber mat.

As further illustrated in FIG. 11B, a post-compression roller and slitter assembly 60 may be used to further process the fiber mats. A slitter may be included in certain embodiments to trim the outside edges of a fiber mat as well as to trim a fiber mat to a desired width. In certain embodiments the fiber mats may be cut into multiple, relatively small width pieces and thus multiple slitters may be employed across the compressed mat. Certain embodiments also include a post-compression roller used to lightly press down upon any frayed edges of the fiber mat that might result from, e.g., the slitting process.

Particular elements involved in the foregoing process are described in detail below.

A. Fiber Mat Manufacture

The initial glass fiber mat may be produced by any of a number of methods known in the art, including, for example, dry-laid, wet-laid or air-laid processes well known to those of ordinary skill in the art. Such processes may optionally involve ordinary (non-vibrational) compression of the initial mat. Accordingly, the schematic glass fiber assembly unit 10 shown in FIGS. 11A and 11B are intended to encompass any one or more pieces of equipment that are useful for production and assembly of an initial glass fiber mat.

In some embodiments, an initial glass fiber mat is produced using a conventional dry-laid process (see, for example, U.S. Pat. Nos. 2,447,161; 2,714,749; 2,720,005; 2,738,556; 2,738,557; 2,748,429; 2,751,633; 2,810,940; 2,827,668; 2,931,076; 3,575,749; 3,581,706; 3,669,778; 3,692,622; 3,733,234; 3,764,451; 3,769,115; 3,776,807; 3,825,381; 3,976,412; 4,014,635; 4,060,360; 4,074,393; 4,335,066; 4,366,111; 4,375,447; 4,375,448; and 5,076,826).

Exemplar Method for Producing Dry-Laid Glass Fiber Mat

A conventional apparatus for producing a dry laid glass fiber mat is shown in FIG. 1. The apparatus comprises a fiberizer 10, a spinner assembly 11, and a rotatable spindle 12. The spindle 12 is rotated at high speed about its longitudinal axis 13 by a motor (not shown), which is operably connected to a belt-driven pulley 14 that is carried by the upper end of the spindle 12.

The spinner assembly 11 that rotates with the spindle 12 includes an internal bowl 15, with a radial peripheral wall 16 having a plurality of small-diameter openings 17. The underside of the spinner assembly 11 includes a heat shield 18 that is frustroconical in shape and reduces heat loss from the bowl 15 of the spinner assembly 11. As the spinner assembly 11 is rotated, molten glass 19 flows through a drop tube 20 in the fiberizer 10 and into the bowl 15. The molten glass is driven by centrifuigal force through the openings 17.

Molten glass that emanates from the openings 17 passes beneath an annular nozzle 21 that surrounds the rotating spinner assembly 11. A continuous jet of heated gas is forced downwardly through the nozzle 21. The heated gas is provided by combustion of a premixed fuel gas within an annular chamber 22 that is lined with refractory 23. The premixed fuel is supplied through screens 24 that prevent flames from traveling back into a fuel supply manifold 25. The gas from the nozzle 21 attenuates the molten glass streams into fine fibers 26 and directs them downwardly. The fibers fall from the spinner assembly 11 in the shape of a generally tubular column 27, known as a fiber veil. The fiber veil 27 falls upon a conveyor surface 28 that moves beneath the fiberizer. The fiber veil 27 collects as a layer of glass fibers or an uncompressed fiber mat 29 on the conveyor surface 28.

The apparatus also includes a duct assembly 30, configured to direct a continuous flow of gas, e.g., air, toward the center of the spinner assembly 11. The air flow direction through the duct assembly 30 is represented by arrows 31. The duct assembly 30 comprises a riser tube 32 upon the top of which is mounted an end tube 33. The riser tube 32 is generally shaped as a 90° elbow, having a lower end 34 connected with a source of compressed air (not shown) that can be regulated to vary the air pressure within the duct assembly. The riser tube 32 extends through the lower portion of the tubular fiber veil 27 and curves upwardly within the veil interior, and is arranged so that its upper end 35 is located beneath the spinner assembly 11. The end tube 33 has an upper end which is circular in cross section and has an inside diameter D that is slightly less than the outside diameter of the bowl 15.

B. Vibrational Compression Assembly

Figure 12B:
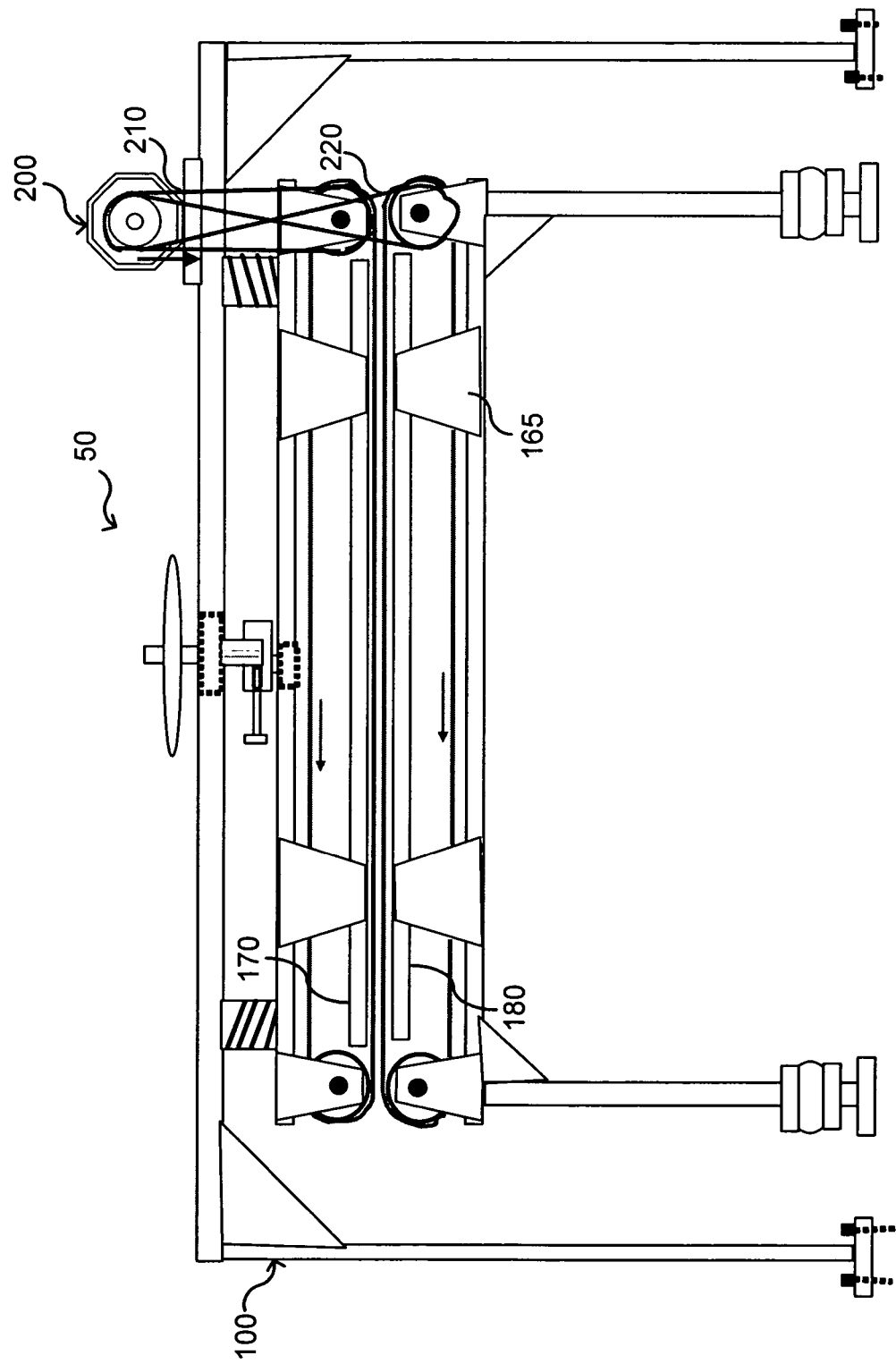

As described generally above, a glass fiber mat is introduced into a vibrational compression assembly capable of contemporarily applying pressure (and/or contact) and vibrational (e.g., orbital) motion to all or part of the mat. One embodiment of a vibrational compression assembly 50 is shown schematically in FIGS. 11B and 12A-C. With reference to FIG. 12A, a vibrational compression assembly 50 includes an upper platen support structure 100 of any configuration that provides a foundation to which applicable elements of the vibrational compression assembly 50 can be attached. The support structure 100 may be substantially immobile during operation of the vibrational compression assembly 50. For example, a table-like structure having at least an upper horizontal member 105 can serve as a suitable upper platen support structure 100.

An orbital plate 120 is mounted below the upper horizontal member 105 using, e.g., tensioning springs 110 in a manner that inhibits downward movement of the orbital plate 120. The tensioning springs 110 and the orbital plate 120 are configured so that upward connection to and/or pressure on the orbital plate 120 is uniformly resisted by the tensioning springs 110 and to permit orbital motion of the orbital plate 120. In one configuration there is a tensioning spring 110 positioned near to each corner of a square- or rectangular-shaped orbital plate 120. Of course other shapes of plates may be used and tensioning can be caused by other suitable means.

The orbital plate 120 is operably linked to an orbital throw assembly 150. With particular reference to FIG. 12C, the orbital throw assembly 150 can be rotated by the operation of an orbital throw motor assembly 300. Rotation of the orbital throw assembly 150 translates into rotational (orbital) motion of the orbital plate 120 and elements fixed to it. The diameter of such orbital motion is determined (and can be adjusted) by the position of an orbital throw adjustment 160.

Affixed to the sides of the orbital plate 120 are two or more platen supports 165 positioned in any manner suitable for supporting an upper platen 170 in a substantially fixed position aligned with and below the orbital plate 120. Also affixed to the sides of the orbital plate 120 at (or near) each corner is a roller support assembly 130 (see, e.g., FIG. 13B for an embodiment of the roller support assembly). The roller support assemblies 130 attached to the orbital plate 120 serve to stably mount two upper sheet rollers 140 below the orbital plate 120. The upper sheet rollers 140 are situated at or near opposing ends of the orbital plate 120 with the long axes of the upper sheet rollers 140 being substantially parallel to each other. A continuous sheet of contact material 185 (such as a sandpaper belt) encircles the two upper sheet rollers 140 and the upper platen 170 so that some portion of the contact material 185 is in close proximity with the lower surface of the upper platen 170. The portion of contact material 185 that is in close proximity with the lower surface of the upper platen 170 at any given point in time is referred to as the "upper contact surface." In some examples, the upper contact surface and the lower surface of the upper platen 170 are separated by 1.27 cm. In more particular examples, the upper contact surface touches the lower surface of the upper platen 170. In some method embodiments, a contact material 185 comprises sandpaper of any grit that will adhere in some manner so as to allow the mat to be vibrationally and preferably orbitally manipulated when used in embodiments of the disclosed methods. The contact material 185 may comprise, for example, coarse (e.g., 36) or fine (e.g., 150) grit sandpaper. Alternative contact materials may be used, such as rubber conveyor belts, paper machine dryer felt (e.g., DRI-PLAN available from Albany International Dryer fabrics). The contact material should have a suitably coarse surface so as to prevent scuffing of the mats, as the fiber masts are preferably held in substantially motionless contact with the surfaces of the conveyor belts during vibration compression. The contact material is to suitably grip the fiber mat such that the inter matrix of the fiber mat is manipulated, preferably in an orbital motion, so as to cause increased fiber entanglement and reduced density.

Figure 13B:
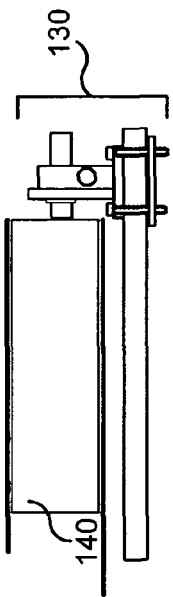
FIGS. 13A-C are schematic views of particular features of one vibration compression apparatus embodiment.

Below and substantially aligned with the upper platen 170 is a lower platen 180. The lower platen 180 is stably mounted above a lower horizontal member 195 by, e.g., platen supports 165. Affixed to the sides of the lower horizontal member 195 at (or near) each corner is a roller support assembly 130 (FIG. 13B). The roller support assemblies 130 attached to the lower horizontal member 195 serve to stably mount two lower sheet rollers 145 above the lower horizontal member 195. A continuous sheet of contact material 185 encircles the two lower sheet rollers 145 and the lower platen 180 so that some portion of the contact material 185 is in close proximity with the upper surface of the lower platen 180. The portion of contact material 185 that is in close proximity with the upper surface of the lower platen 180 at any given point in time is referred to as the "lower contact surface." In some examples, the lower contact surface and the upper surface of the lower platen 180 are separated by 1.27 cm. In certain embodiments the lower contact surface touches the upper surface of the lower platen 180.

A pressure adjustment assembly 190 can be used to adjust the vertical position (for example, height above the floor) of the lower horizontal member 195 and elements affixed to it (such as, the lower platen 190, the lower sheet rollers 145 and the contact material 185 encircling them). As the vertical position of the lower horizontal member is raised, the distance between the upper platen 170 and the lower platen 180 is decreased. Accordingly, the distance between the lower contact surface and the upper contact surface is decreased.

Figure 13A:
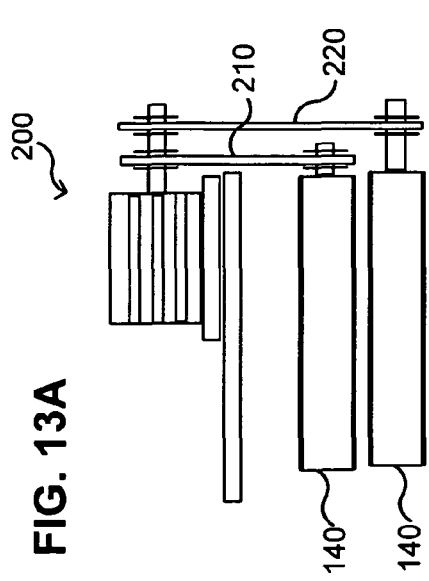
Figure 13C:
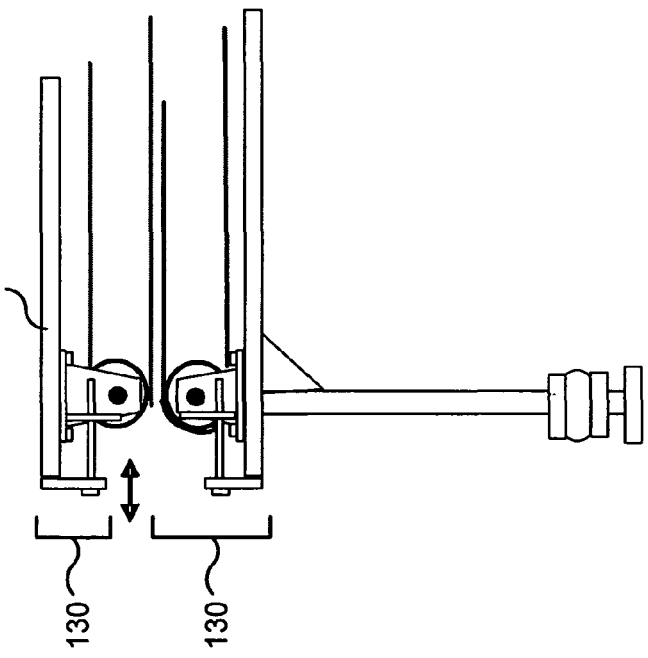
Figure 14:
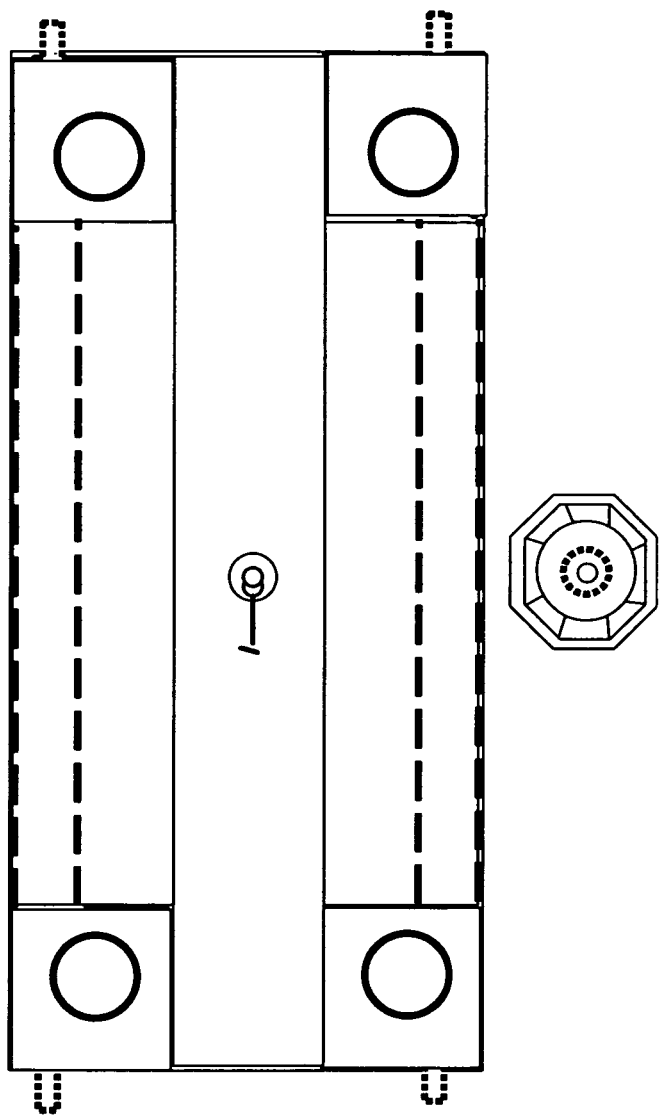
FIG. 14 is a top view of an embodiment of an orbital plate illustrating an offset in the center that moves the plate in the orbital motion.

As shown in FIG. 12B and, more particularly, in FIG. 13A, a roller drive assembly 200 rotates the upper sheet rollers 140 and the lower sheet rollers 145 in opposing directions. In the illustrated embodiment, the upper sheet rollers 140 turn in a counterclockwise direction and the lower sheet rollers 145 turn in a clockwise direction. Accordingly, contact material 185 encircling the upper sheet rollers 140 moves in a counterclockwise direction, and contact material 185 encircling the lower sheet rollers 145 moves in a clockwise direction. Where vertically opposed sheet rollers rotate toward each other, they will tend to pull materials inserted between them (such as a glass fiber mat) into the vibrational compression assembly 50. This is referred to as the "feed end" of the vibrational compression assembly 50. The vertically opposed sheet rollers located opposite the feed end rotate away from each other and, thereby, assist materials inserted into the feed end to exit the vibrational compression assembly 50. This is referred to as the "exit end" of the vibrational compression assembly 50.

In operation of the vibrational compression assembly 50, a fiber mat, e.g., glass or polymeric fiber mat, is inserted into the feed end of the apparatus. The mat is sandwiched on the top by the upper contact surface and the upper platen 170 and on the bottom by the lower contact surface and the lower platen 180. The upper and lower surfaces of the mat are in physical contact with the upper and lower contact surfaces, respectively. By action of the orbital throw assembly 160 (described above), the upper contact surface moves orbitally in contact with the corresponding surface of the mat Orbital rates are any desired and suitable rates, such as about 1,000 to about 15,000, about 2,000 to about 11,000, and about 3,000 to about 8,000 orbits per minute. The effect of such orbital motion is vibration and thus increased entanglement of the internal structure of the glass fiber mat. Although the vibration motion is discussed primarily in terms of orbital motion, other motions may be used to result in a vibrationally compressed mat. At substantially the same time the mat is being vibrated, in an alternative embodiment and method, the platen can be forced against the fiber mat to aid in compression of the mat. In some examples, forces in the range of from about range from about 5 kg to about 50 kg, such as, from about 7 kg to about 40 kg, from about 10 kg to about 30 kg, or from about 15 kg to about 25 kg.

C. Vibrational Compression of Fiber Mat

As mentioned previously, the disclosed methods may include vibrational compression of mats comprising glass fibers, non-glass fiber mats, or mats having some proportion of non-glass fibers (such as, polymeric fibers, polyolefin, polyethylene terephthate, carbon, or cellulose fibers) with the glass fibers. Mats comprising from about 2 to about 98% glass fibers typically have a density, under no load or substantially no load, of from about 12 D to about 50 D $kg/m^3$ for dry-laid mats, and from about 90 D to about 250 D $kg/m^3$ for wet-laid mats (where "D" is the ratio of the density of the non-glass fiber material to the density of glass). Vibration compression according to the disclosed methods in certain embodiments increases the density of a dry-laid mat comprising from about 2 to about 100% (or substantially all) glass fibers by at least about 25%, by at least about 50%, or by at least about 75%. Dry-laid fiber mats having from about 25% to about 100% glass fibers have been compressed by the present vibration methods to have densities increased by about 5% to about 75%, and dry-laid fiber mats comprising from about 50% to about 100% glass fibers have been compressed using the present vibration methods to have density values increased by about 15% to about 70%, in other embodiments wherein the dry-laid mats comprise from about 75% to about 100% glass fibers, the fiber mats densities have been increased by about 35% to about 60%. In other examples, the density of a wet-laid mat consisting of some or all non-glass fibers can be increased by at least about 5%, such as by at least about 10%.

The disclosed methods may involve both vibrational compression and force compression (externally applied force) of a mat. In certain embodiments only vibrational compression is utilized although some nominal force is applied to the mat during the vibrational compression process. In some embodiments, vibrational compression and force compression are applied to a mat at substantially the same time. In other embodiments, the mat may receive sequential vibrational compression and force compression treatment.

Vibration of a mat as disclosed herein can be any vibrational movement that aids in compressing the fiber mat. Although orbital vibrational compression is primarily discussed and may be preferred for producing certain types of fiber mats having particular thicknesses and/or densities, the methods are not limited to such vibrational motions. Orbital vibration compression may be characterized, for example, in terms of the orbital rate and orbital diameter of a contact surface that is in contact with at least a portion of one or more surfaces of the mat. In certain embodiments an orbit diameter can be in the range from about 1.5 mm to about 2.5 mm (about $\frac{1}{16}$ to about 2 inches), or from about 4.76 mm to about 6.35 mm. Orbital rates can be any desired and suitable rate to produce a mat of the density and thickness desired. Representative orbital rates include, without limitation, about 1,000 to about 15,000, about 2,000 to about 11,000, about 3,000 to about 8,000, or about 1,000 to about 20,000 orbits per minute, such as about 3,000 to about 14,000 orbits per minute.

A mat can be force compressed, for example, by pressing the mat between two platens. In one example, one such platen also moves in an orbital fashion so that vibrational compression and force compression are applied contemporaneously to the mat. The force applied in the disclosed methods can range from about 5 kg to about 50 kg, such as, from about 7 kg to about 40 kg, from about 10 kg to about 30 kg, or from about 15 kg to about 25 kg (or about 0.5 to about 10 psi, or about 1.0 to about 20 psi, or about 2 to about 5 psi). In particular embodiments of the methods the force applied to a mat is about 9 kg (such as, 9.07 kg) or about 27 kg (such as, 27.3 kg).

Vibration compression, with or without force compression, is applied to a fiber mat for such time as is sufficient to change (typically increase) at least one physical property of the mat (for instance, apparent density or tensile strength). As mentioned, there is a certain amount of nominal force applied to the fiber mat by virtue of the vibration compression methods. However, the vibration compression can also be accompanied by force compression. In one embodiment, vibrational compression is applied to the mat for about 5 seconds to about 2 minutes, including, for example, for about 10 seconds to about 1 minute, or for about 15 seconds to about 45 seconds, or for about 15 seconds to about 30 seconds. As clear to those of ordinary skill in the art, the amount of time for vibration compression depends in part upon the size of fibers, on the desired mat density and thickness. The thicker the mat to be compressed (i.e., the more material there is to compress) the more time it takes to compress (depending on the target density).

The fiber mat compression methods may include a single vibration compression process, a double process wherein the mat goes through two vibration processes (or more) or is flipped over and processed a second time. Such methods may or may not include force compression as well.

III. Compressed Fiber Mats

The disclosed methods can be used to produce compressed wet-laid or dry-laid fiber mats. Certain embodiments may comprise any suitable type of fiber(s) depending upon the desired end use and may be vibrationally compressed without substantial breakage including, for example, glass, polyolefin, polyethylene terephthate, carbon, cellulose fibers, or combinations thereof. Any number of different fiber mat materials can be multi-layer together to make a mat suitable for used in certain examples of the disclosed methods. In specific embodiments, multi-layer mats contain coarse and fine glass fibers; cellulose and glass fibers; cellulose, carbon and glass fiber; or glass fibers having a variety of glass chemistries such as but not limited to those discussed in ASM International Volume 4 Engineer Material Handbook—Ceramic and Glasses, ISBN 0-87170-282-7, Fiberglass Chapter. In certain embodiments, the diameters of glass or other material fibers present in the mat range from about 0.2 µm to about 30 µm; for example, from about 0.5 µm to about 25 µm, about 1.0 µm to about 20 µm, about 2.0 µm to about 15 µm, about 2.0 µm to about 10 µm, from about 0.6 µm to about 4 µm. In yet other embodiments, the surface area of the fibers is greater than about 0.2 m²/g.

The compression methods produce fiber mats having one or more physical properties of the mat changed or enhanced, such as apparent density or tensile strength. Fiber mats whose properties have been changed or enhanced by the disclosed methods are suited, for example, for use as or in battery applications such as in lead acid valve-regulated storage (VRLA) batteries, nickel metal hydride batteries, insulation and insulation boards of all kinds (which, in some embodiments have densities of about as high as 300 kg/m³ while remaining bendable without substantial breakage or cracking), electrical insulation, industrial/home wipes, acoustical insulation, fluid absorbing media, and filter media.

Wet- or dry-laid fiber mats suitable for use in the disclosed methods can, optionally, contain any type of resin or thermal fiber type systems binder known in the art. Non-limiting representative binders used in wet-laid mats include latex resins, phenolic resins, starches, polyester, PVA. For dry laid glass fiber mats, such as used for house insulations, pipe wrap, and some electronics application, the binders may comprise any suitable binders known to those of ordinary skill in the art.

Some exemplar methods produce fiber mats having increased apparent density. Without being limited by any particular theory, it is believed that vibration compression increases the intermeshing of the fibers with one another. A typical non-compressed, dry-laid, glass-fiber mat has an apparent density under no external force of from about 12 to about 50 kg/m³, and a typical non-compressed, wet-laid glass-fiber mat has an density under no or substantially no external force of from about 90 to about 250 kg/m³. Some method embodiments produce fiber mats having increased densities of at least about 5%; for example, of at least about 10%, about 15%, about 20%, about 25%, about 50%, or about 75%. In particular examples of dry-laid, glass-fiber mats, the disclosed methods can produce fiber mats having increases densities of at least about 10%, at least about 15%, or at least about 20%; although, density greater than about 25%, or even of about 50% or 75%, above control can be achieved. In particular examples of wet-laid glass-fiber mats that have a higher initial apparent density than dry-laid glass fiber mats, the densities can be increased by about 10%, about 15% or about 20%.

Put another way, the dry-laid vibrationally compressed glass fiber mats disclosed herein may have densities of at least about 60 kg/m³, or at least about 100 kg/m³ or at least about 120 kg/m³, or at least about 175 kg/m³ or at least about 200 kg/m³, or at least about 300 kg/m³, in the absence of, or in the presence of nominal, external force. That is, there may be nominal external force due to the weight of the platen and gripper material (e.g., about 2 psi on a mat having a surface area of about 4"×6"). Certain embodiments of the vibrationally compressed fiber mats have densities as high as at least about 135 kg/m³ in the absence of any external force. The vibrationally compressed dry-laid fiber mats disclosed herein do not need to undergo any needle-punch process to increase fiber entanglement and hence increase mat density. The entanglement degree of the vibrationally compressed fiber mats produced with the present methods show enhanced uniformity and/or the retention of longer fiber length (i.e., less fiber breakage) and/or increased tensile strength. For example, certain embodiments of the disclosed dry-laid vibrationally compressed glass fiber mats have tensile strength of at least about 0.45 kg or of at least about 1.1 kg or of at least about 2.2 kg for mats of thicknesses of about 6 mm. Certain embodiments of the vibrationally compressed fiber mats have tensile strengths of as high as at least about 2.2 kg and with the addition of enforcement scrims of mesh tensiles of greater than about 4.5 kg.

The following examples are provided to illustrate certain particular features and/or embodiments. These examples should not be construed to limit the disclosure to the particular features or embodiments described.

EXAMPLES

Example 1

Effect of Orbital Diameter and Vibration Rate on the Fiber Mat Compression as a Function of Time This example describes an apparatus useful for vibrational compression of a fiber mat such as a glass or polymeric fiber mat and further demonstrates that a pre-formed glass fiber mat can be rapidly compressed (for example, in less than about 30 seconds) to about 80% of its original thickness using two different vibrational compression protocols. That is, the density of the mat is increased such that the total thickness after vibrational compression is about 80% of the thickness prior to compression.

An apparatus comprising two, opposed 10.2×15.2 cm horizontal platens was used in this example. The first platen was mounted on a support that prevented it from moving vertically downwardly while the second platen was positioned above and vertically aligned with the first platen. The second platen was free to move vertically downwardly to contact the first platen. Sheets of 10.2×15.2 cm coarse sandpaper were attached to the upper and lower surfaces of the first and second platens.

A 10.2×15.2 cm dry-laid glass fiber mat having a grammage of 880 g/m$^2$ and composed of glass fibers having an average diameter of 1.4 μm was placed on the sandpaper adhered to the first platen. The mat was then compressed by the second platen, which was oscillated and urged vertically downwardly toward the first platen by a force of 18.2 kg for a period of time which ranged from about 5 to about 60 seconds. The oscillation of the second platen was an orbital vibration that caused the bottom surface thereof to move in a circular path. In one series of tests, the orbital vibration involved an orbital diameter of 1.59 mm (1/16 inch) at 13,500 orbits per minute. In another series of tests, the orbital vibration involved an orbital diameter of 4.76 mm (3/16 inch) at 8000 orbits per minute.

The samples tested were composed of four mats each of which, under no load, had an initial thickness of about 19 mm and weighed about 220 g/m$^2$ That is, a single 880 GSM (6 mm) fiber mat was formed from four layers of 220 GSM fiber mats (as shown in FIG. 1B sample number 40). After vibration, the adjacent ones of the major surfaces of the four mats were attached to one another as a consequence of the entanglement of fibers of one mat with fibers of the adjacent mat(s), so that the four mats were formed into a single mat.

The thicknesses of the glass fiber mats were determined at a pressure of 10 kPa after oscillation for various periods of time. When the diameter of the circular path was 4.76 mm (3/16 inch), the samples were deemed to be fully compressed after 35 seconds. Compression for a longer time caused scuffing of the mat rather than further compression.

Figure 10:
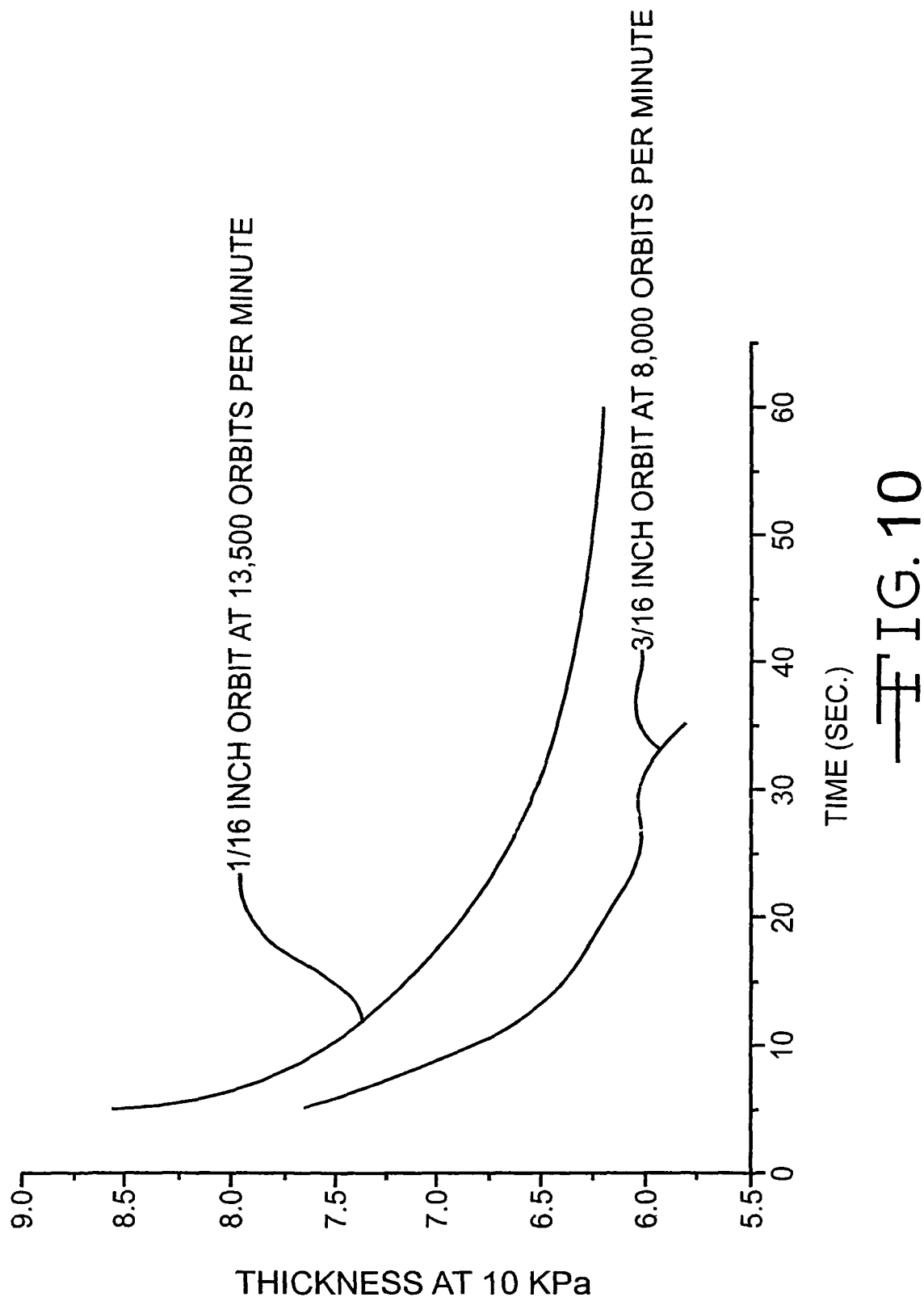
FIG. 10 is a graph showing mat thickness of an embodiment of the disclosed mat after different time periods of vibration compression, in a first embodiment of the method a platen used for the compression was moved in an orbit having a diameter of 4.76 mm and, in a second embodiment of the method a platen was moved in an orbit having a diameter of 1.59 mm.

The results of the foregoing tests (mean values of five determinations) are set forth in FIG. 10. FIG. 10 shows that the platen with the larger orbit diameter of 4.76 mm (3/16 inch) at 8000 orbits per minute, compressed the mat faster than the platen with the 1.59 mm (1/16 inch) orbital diameter at 13,500 orbits per minute. As can be concluded from the results shown in FIG. 10, under 40 lbs of down force on each platen, the larger orbit of 3/16$^{th}$ compressed the 800 GSM mat to its maximum compression 25 seconds faster than the method wherein the platen had a 1/16$^{th}$ orbit.

Example 2

Comparison of Vibrational Compression Conditions

The apparatus described in Example 1 was used to compress the glass fiber mats either "dry" (such as in Example 1) or "wet", after they had been conditioned so that glass fibers constituted substantially 25% by weight of each mat, and water constituted 75% by weight of each. Conditioning of the mat includes the addition of the water sprayed onto the surface of the mat until the appropriate percentage water by weight was achieved. In some cases, the contact material on the platens was coarse while, in others, it was fine sandpaper. The force applied to the second platen was 9.07 kg in some cases; in others, the force was 27.2 kg. In all cases, the mat was subjected to vibrational and force (9.07 kg or 27.2 kg) compression for 20 seconds.

The following table summarizes the condition of the mat before it was compressed, the amount of force used, the type of sandpaper used on the first and second platens, and the diameter of the orbit in which the second platen was vibrated. The table also shows the "grammage" (the weight of the initial mat in grams per square meter (g/m$^2$)) and the thickness of the compressed mat both when under a pressure of 10 kPa and when not under pressure.

| Sample No. | Mat Condition | Applied Force (kg) | Sandpaper | Orbit Diameter (mm) | Grammage (g/m$^2$) | Thickness (mm @ 10 kPa) |
|---|---|---|---|---|---|---|
| 1 | Dry | 9.06 | Coarse | 1.59 | 890.9 | 8.29 |
| 2 | Dry | 27.3 | Coarse | 1.59 | 804.7 | 7.74 |
| 3 | Wet | 9.06 | Coarse | 1.59 | 797.5 | 6.82 |
| 4 | Wet | 27.3 | Coarse | 1.59 | 812.8 | 6.77 |
| 5 | Dry | 9.06 | Fine | 1.59 | 909.2 | 8.49 |
| 6 | Dry | 27.3 | Fine | 1.59 | 900.6 | 8.11 |
| 7 | Wet | 9.06 | Fine | 1.59 | 856.0 | 8.09 |
| 8 | Wet | 27.3 | Fine | 1.59 | 923.0 | 8.35 |
| 9 | Dry | 9.06 | Coarse | 4.76 | 851.2 | 7.86 |
| 10 | Dry | 27.3 | Coarse | 4.76 | 891.7 | 7.72 |
| 11 | Wet | 9.06 | Coarse | 4.76 | 763.4 | 6.18 |
| 12 | Wet | 27.3 | Coarse | 4.76 | 834.6 | 6.05 |
| 13 | Dry | 9.06 | Fine | 4.76 | 902.0 | 7.96 |
| 14 | Wet | 27.3 | Fine | 4.76 | 856.7 | 7.03 |
| 15 | Wet | 9.06 | Fine | 4.76 | 887.3 | 7.33 |

Figure 2:
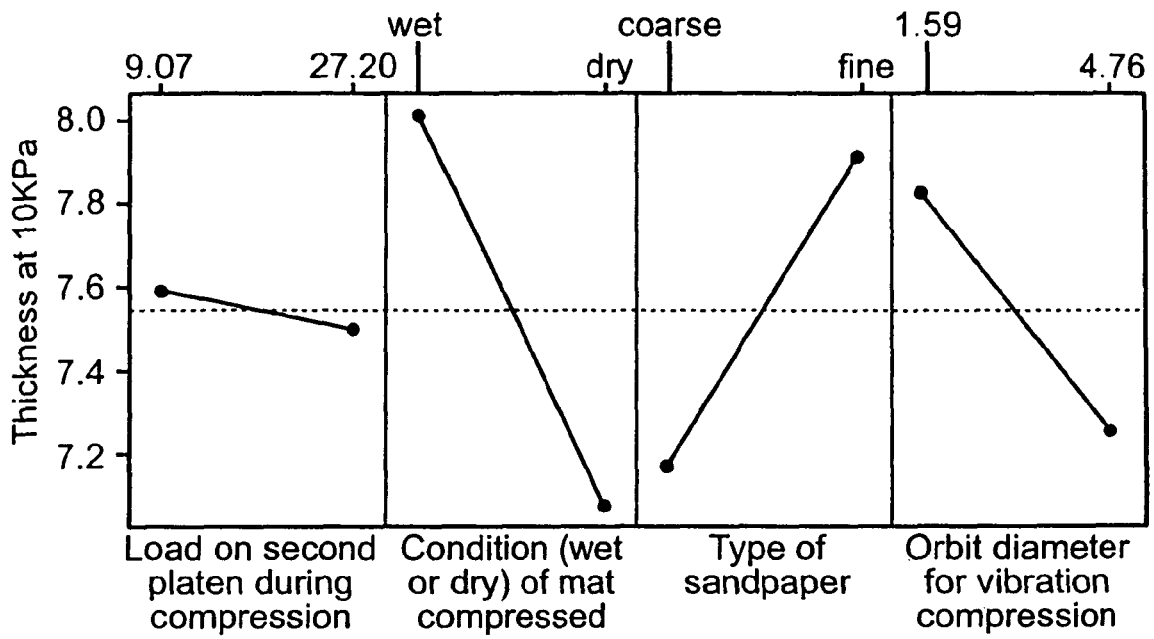
FIG. 2 is a graph composed of four side by side plots: thickness of glass fiber mat under a load of 10 kPa versus load used during vibration compression, the condition (wet or dry) of the mat compressed, the type (coarse or fine) of contact material on platens used in the vibration compression, the diameter of the orbit of the vibration.

Mean values were calculated from the data in the foregoing table for the thickness of the mat in mm at 10 kPa (1) when the "downward" force on the second platen was 9.06 kg along with orbital vibration; (2) when the "downward" force on the second platen was 27.3 kg with orbital vibration; (3) when the mat was dry; (4) when the mat was wet; (5) when coarse sandpaper was used on the platens; (6) when fine sandpaper was used on the platens; (7) when the orbit diameter was 1.59 mm; and (8) when the orbit diameter was 4.76 mm. The mean values are plotted in FIG. 2, down force of 9.06 kg versus down force of 27.3 kg; when the mat was wet versus when the mat was dry; when the sandpaper was coarse versus when the sandpaper was dry; and when the orbit diameter was 1.59 mm versus when the orbit diameter was 4.76 mm. As shown by the results plotted in FIG. 2, the mat compressed best (dry) when a coarse contact material and an orbit diameter of 4.76 mm. The downward force in this embodiment of the method appears to have little effect on the results. As shown by the results in FIG. 3, to achieve superior tensile strength, the fiber mat is compressed (dry) using a 4.76 mm diameter orbit. FIG. 2 shows that, whether the mat compressed was wet or dry or whether the sandpaper was coarse or fine, orbit diameter influenced the thickness of the mat after vibration compression more than did the magnitude of the "down" force on the second platen.

The density (kilograms per cubic meter) of each of the compressed mats produced as described in this example was also determined, as were the resistance to airflow (mm H$_2$O, as measured by a Frazier Air Permeability Instrument), tensile strength (which term is used herein to mean the load in kilograms required to break a 2.54 cm by 7.62 cm specimen of the mat) and the percent elongation of the 2.54 cm by 7.62 cm specimen of the mat at break. These values are set forth in the following table. (All samples in the Examples herein, unless indicated, were dry-laid. When added, moisture was been added just prior to compression. In the series of test 1-15, wet samples all contained approximately 30% moisture.)

| Sample No. | Density (kg/m³) | Resistance to Airflow (mm H₂O) | Tensile Strength (kg) | Percent Elongation |
|---|---|---|---|---|
| 1 | 92 | 127 | 0.9 | 4.3 |
| 2 | 69 | 110 | 0.4 | 4.5 |
| 3 | 124 | 115 | 1.2 | 3.1 |
| 4 | 128 | 113 | 1.3 | 2.2 |
| 5 | 88 | 121 | 1.0 | 3.7 |
| 6 | 86 | 119 | 0.7 | 4.0 |
| 7 | 104 | 137 | 0.9 | 2.9 |
| 8 | 103 | 126 | 1.1 | 2.3 |
| 9 | 83 | 118 | 0.7 | 3.7 |
| 10 | 94 | 133 | 1.0 | 3.3 |
| 11 | 148 | 112 | 1.0 | 2.5 |
| 12 | 147 | 124 | 2.0 | 1.9 |
| 13 | 90 | 126 | 0.9 | 4.0 |
| 14 | 120 | 156 | 1.3 | 2.1 |
| 15 | 125 | 148 | 1.4 | 1.9 |

Mean values were calculated from the data in the foregoing table for the tensile strength of the mat (1) when the "downward" force on the second platen was 9.06 kg with orbital vibration; (2) when the "downward" force on the second platen was 27.3 kg with orbital vibration; (3) when the mat was dry; (4) when the mat was wet; (5) when coarse sandpaper was used on the platens; (6) when fine sandpaper was used on the platens; (7) when the orbit bit diameter was 1.59 mm; and (8) when the orbit diameter was 4.76 mm. These mean values are plotted in FIG. 3, down force of 9.06 kg versus down force of 27.3 kg; when the mat was wet versus when the mat was dry; when the sandpaper was coarse versus when the sandpaper was dry; and when the orbit diameter was 1.59 mm versus when the orbit diameter was 4.76 mm.

Figure 3:
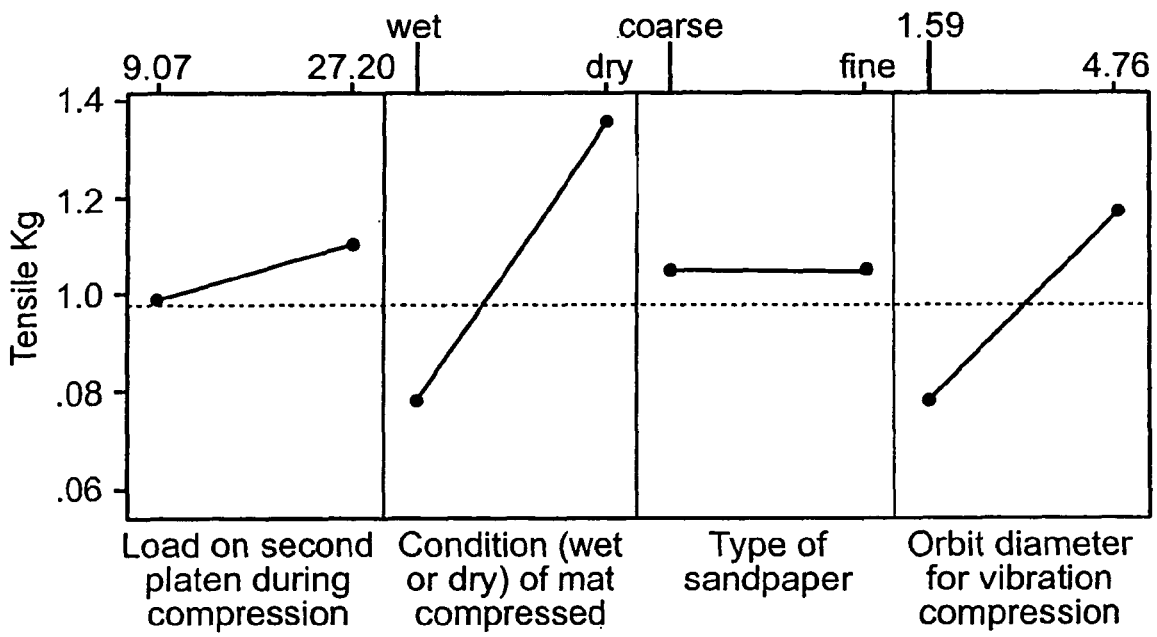
FIG. 3 is a graph composed of four side by side plots: tensile strength of vibration compressed glass fiber mat versus load used during vibration compression, the condition (wet or dry) of the mat compressed, the type (coarse or fine) of contact material used during vibration compression, the diameter of the orbit of the vibration.

FIG. 3 demonstrates that, whether the mat compressed was wet or dry, the downward force on the second platen influenced the tensile strength of the mat after vibration compression more than did either the orbit diameter or whether the sandpaper was coarse or fine.

The percent that each of the mats was compressed under loads of 10.3 kPa, 20.7 kPa and 51.7 kPa was determined, as was the percentage recovery when the compressive load was released. The percentage compression (% C) of each of the mats under the indicated loads is presented in the following table together with the percent recovery (% R) when the load was released.

| | Compressive Load | | | | | |
|---|---|---|---|---|---|---|
| | 10.3 kPa | | 20.7 kPa | | 51.7 kPa | |
| Sample No. | % C | % R | % C | % R | % C | % R |
| 1 | 140 | 98.2 | 23 | 96.7 | 44 | 93.8 |
| 2 | 17 | 97.5 | 28 | 95.7 | 50 | 90.9 |
| 3 | 8 | 97.9 | 16 | 96.6 | 35 | 94.9 |
| 4 | 11 | 98.4 | 18 | 96.9 | 39 | 92.1 |
| 5 | 16 | 98.3 | 26 | 96.4 | 50 | 90.3 |
| 6 | 16 | 98.4 | 27 | 95.7 | 49 | 91.4 |
| 7 | 8 | 98.4 | 15 | 97.0 | 36 | 93.1 |
| 8 | 11 | 96.5 | 20 | 94.5 | 43 | 89.9 |
| 9 | 14 | 97.2 | 22 | 95.3 | 43 | 89.4 |
| 10 | 15 | 98.2 | 24 | 96.6 | 44 | 92.5 |
| 11 | 5 | 98.7 | 10 | 97.2 | 28 | 93.7 |
| 12 | 5 | 98.7 | 10 | 97.3 | 27 | 95.2 |
| 13 | 16 | 97.7 | 24 | 95.7 | 45 | 91.4 |
| 14 | 7 | 98.2 | 13 | 97.1 | 31 | 93.3 |
| 15 | 6 | 98.5 | 13 | 97.0 | 32 | 93.7 |

The results in the Table above indicate that the orbital compressed mat can recover up to greater than about 90% of its original thickness when pressed under 51.7 KPa of pressure (when compressed wet or dry).

Example 3

Vibrational Compression Apparatus Containing Stops Between Platens

An apparatus similar to that described in Example 1 was modified to add stops extending 3 mm below the bottom surface of the second platen. This modified apparatus was used to compress glass fiber mats as described in Examples 1 and 2, either "dry", as produced, or "wet", after having been conditioned so that substantially 75% by weight of each mat was water. When the stops struck the first platen, they prevented further movement of the second platen toward the first, so that the two were separated by at least 3 mm at the end of each compression. In some cases, the sandpaper on the platens was coarse while, in others, it was fine sandpaper.

The following table summarizes the condition of the mat (all dry-laid mats) before compression, the type of sandpaper on the first and second platens, the diameter of the orbit of the second platen, the "grammage" (the weight in grams per square meter) and the thickness of the compressed mat both when under a pressure of 10 kPa and when not under pressure.

| Sample No. | Mat Condition | Sandpaper | Orbit Diameter (mm) | Grammage (g/m²) | Thickness (mm @ 10 kPa) |
|---|---|---|---|---|---|
| 1 | Wet | Fine | 1.59 | 955 | 7.76 |
| 2 | Dry | Fine | 1.59 | 895 | 7.31 |
| 3 | Wet | Coarse | 1.59 | 884 | 6.85 |
| 4 | Dry | Coarse | 1.59 | 871 | 7.00 |
| 5 | Wet | Fine | 4.76 | 921 | 6.99 |
| 6 | Dry | Fine | 4.76 | 894 | 6.89 |
| 7 | Wet | Coarse | 4.76 | 864 | 6.76 |
| 8 | Dry | Coarse | 4.76 | 881 | 6.88 |

Figure 4:
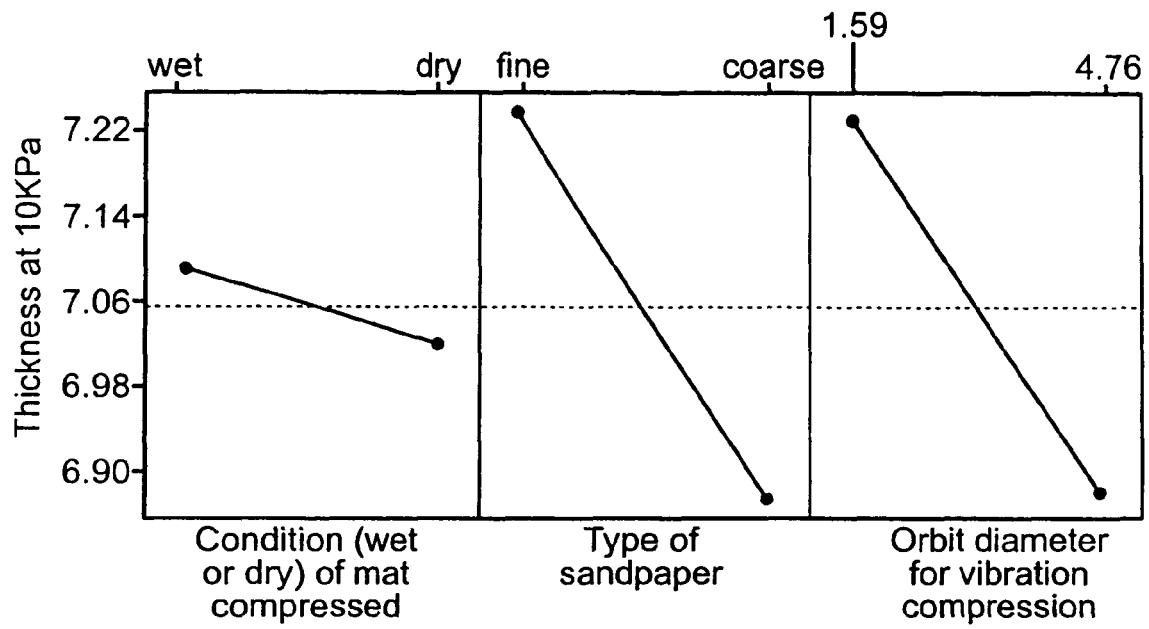
FIG. 4 is a graph composed of three side by side plots: the thickness of the vibration compressed mat under a load of 10 kPa versus the condition (wet or dry) of the mat compressed; the type contact material used during vibration compression; and the diameter of the orbit of the vibration.
Figure 5:
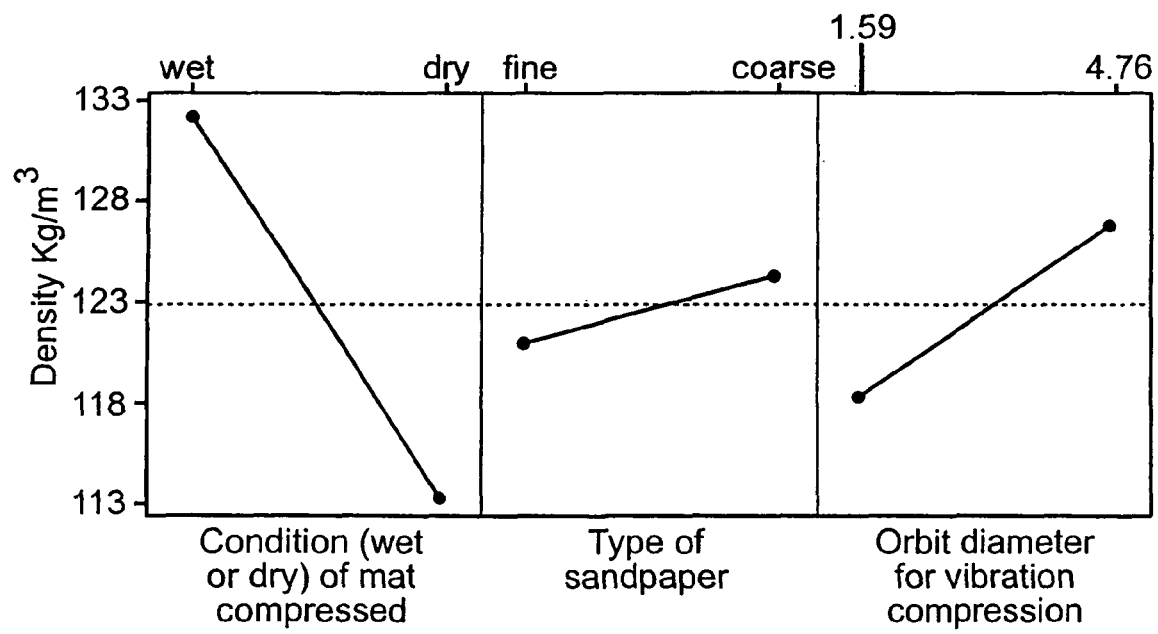
FIG. 5 is a graph composed of three side by side plots: the density of vibration compressed mat in $kg/m^3$ versus the condition (wet or dry) of the mat compressed; the type of contact material used during vibration compression; and the diameter of the orbit of the vibration.
Figure 6:
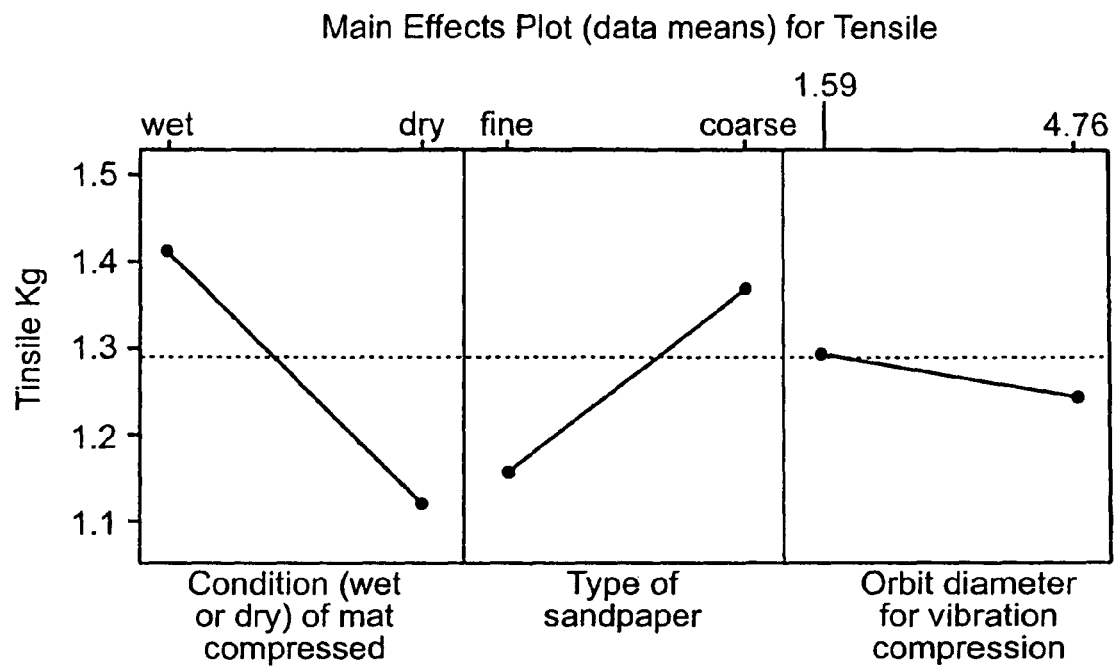
FIG. 6 is a graph composed of three side by side plots: the tensile strength of vibration compressed mat in $kg/m^3$ versus the condition (wet or dry) of the mat compressed; the type of contact material used during vibration compression; and the diameter of the orbit of the vibration.

Mean values were calculated from the data in the foregoing table for the thickness of the compressed mat in mm at 10 kPa (1) when the mat was dry; (2) when the mat was wet; (3) when coarse sandpaper was used on the platens; (4) when fine sandpaper was used on the platens; (5) when the orbit diameter was 1.59 mm; and (6) when the orbit diameter was 4.76 mm. These mean values are plotted in FIG. 4, when the mat was wet versus when the mat was dry; when the sandpaper was coarse versus when the sandpaper was dry; and when the orbit diameter was 1.59 mm versus when the orbit diameter was 4.76 mm. FIG. 4 indicates that for the data plotted whether the mat compressed was wet or dry influenced the thickness the mat after vibration compression less than did whether the sandpaper was coarse or fine and orbit diameter.

The density (kilograms per cubic meter) of each of the compressed mats (numbers 1-8, each dry-laid) was also determined, as were the resistance to airflow (mm H₂O, as measured using a Frazier Air Permeability Instrument, available from Frazier Precision Instrument Co.) tensile strength and the percent elongation. These values are set forth in the following table:

| Sample No. | Density (kg/m³) | Resistance to Airflow (mm H₂O) | Tensile Strength (kg) | % Elongation |
|---|---|---|---|---|
| 1 | 128 | 152 | 1.5 | 1.7 |
| 2 | 107 | 167 | 1.0 | 3.0 |
| 3 | 127 | 146 | 1.4 | 1.9 |
| 4 | 112 | 183 | 1.2 | 3.3 |
| 5 | 132 | 193 | 1.2 | 2.0 |
| 6 | 117 | 156 | 0.9 | 3.3 |
| 7 | 142 | 144 | 1.5 | 1.8 |
| 8 | 117 | 200 | 1.3 | 2.8 |

Figure 7:
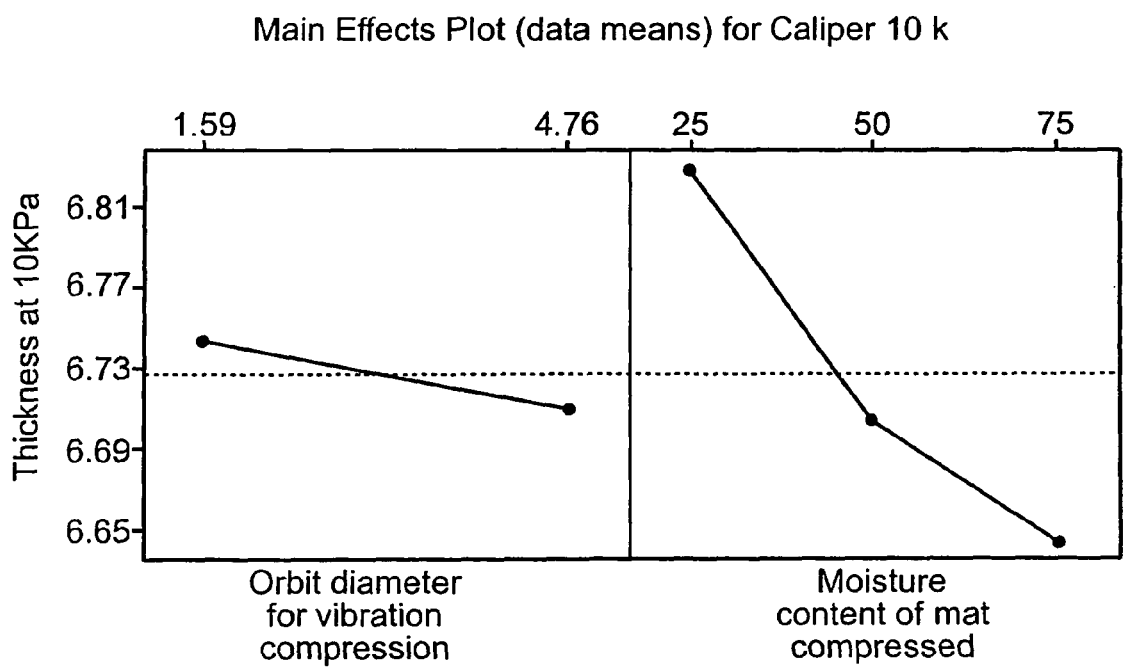
FIG. 7 is a graph composed of two side by side plots: the thickness in mm under a load of 10 kPa of vibration compressed mat versus the diameter of the orbit of the vibration; and the moisture content of the mat compressed.
Figure 8:
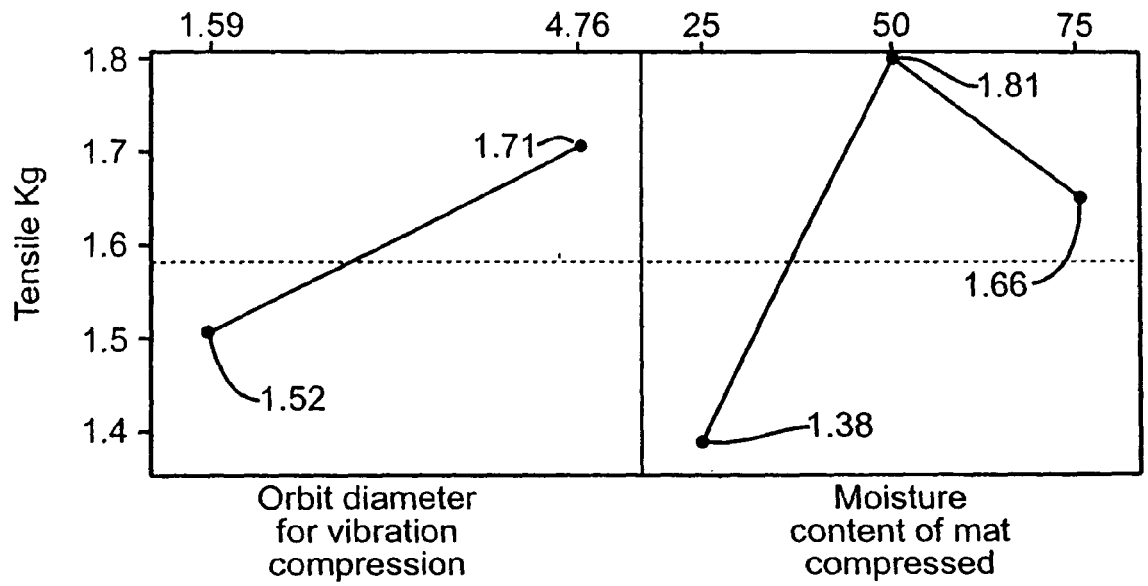
FIG. 8 is a graph composed of two side by side plots: the tensile strength in pounds of certain embodiments of the disclosed vibrationally compressed mats versus the diameter of the orbit of the vibration; and the moisture content of the mats compressed.

Mean values were calculated from the data in the foregoing table for the density of the mat in kg per m³ and for the tensile strength in kilograms of the mat (1) when the mat was dry; (2) when the mat was wet; (3) when coarse sandpaper was used on the platens; (4) when fine sandpaper was used on the platens; (5) when the orbit diameter was 1.59 mm; and (6) when the orbit diameter was 4.76 mm. These mean values are plotted in FIGS. 7 and 8, when the mat was wet versus when the mat was dry; when the sandpaper was coarse versus when the sandpaper was fine; and when the orbit diameter was 1.59 mm versus when the orbit diameter was 4.76. FIG. 7 indicates that for the data plotted, whether the mat compressed was wet or dry, influenced the thickness of the mat after vibration compression more than did whether the sandpaper on the platens was coarse or fine, and more than did the orbit diameter. FIG. 8 indicates that, for the data plotted, orbit diameter influenced the tensile strength less that did either the identity (wet or dry) of the mat compressed or whether the sandpaper on the platens was coarse or fine.

Finally, the percent that each of the mats was compressed under loads of 10.3 kPa, 20.7 kPa and 51.7 kPa was determined, as well as the percentage recovery when the compressive force was released. The percent that each mat was compressed (% C) under these loads is given in the following table together with the percent recovery (% R) when the load was released.

| | Compressive Load | | | | | |
|---|---|---|---|---|---|---|
| | 10.3 kPa | | 20.7 kPa | | 51.7 kPa | |
| Sample No. | % C | % R | % C | % R | % C | % R |
| 1 | 81 | 98.0 | 15 | 96.5 | 36 | 92.3 |
| 2 | 15 | 98.8 | 24 | 97.2 | 44 | 92.8 |
| 3 | 7 | 98.3 | 14 | 96.9 | 35 | 92.7 |
| 4 | 17 | 98.6 | 24 | 97.1 | 45 | 92.6 |
| 5 | 6 | 98.4 | 13 | 97.2 | 32 | 94.1 |
| 6 | 13 | 99.1 | 21 | 97.6 | 40 | 93.4 |
| 7 | 6 | 98.3 | 13 | 96.9 | 33 | 93.0 |
| 8 | 13 | 98.5 | 20 | 97.3 | 39 | 93.6 |

The results tabulated in the Table above indicate that using a gap that prevents continuous pressure on the mat, whether the mat is pressed wet or dry or whether the contact material used was coarse or fine, the mat still recovers to greater than about 90% of its original thickness. The mat was compressed with 51.7 Kpa of pressure to about 35% of its original thickness.

Example 4

Vibrational Compression of Glass-Fiber Mats Having Differing Moisture Contents

The apparatus described in Example 1 was used to compress dry-laid glass fiber mats as described in Example 1 after they had been conditioned to have a moisture content of 25%, 50%, or 75%, based up the weight of the mat plus the weight of the fibers. The contact material used was the sandpaper described in Example 1. The force applied to the second platen (along with the vibrational compression) to compress the mat was 18.1 kg. The moisture content of the mat before it was compressed, and the diameter of the orbit in which the second platen was vibrated are set forth in the following table, together with the "grammage" (the weight in grams per square meter) and the thickness of the compressed mat both when under a pressure of 10 kPa and when not under pressure.

| Sample No. | Moisture Content % | Orbit Diameter (mm) | Grammage (g/m²) | Thickness (mm @ 10 kPa) |
|---|---|---|---|---|
| 1 | 25 | 1.59 | 842 | 6.91 |
| 2 | 50 | 1.59 | 892 | 6.73 |
| 3 | 75 | 1.59 | 867 | 6.59 |
| 4 | 25 | 4.76 | 875 | 6.75 |
| 5 | 50 | 4.76 | 849 | 6.68 |
| 6 | 75 | 4.76 | 874 | 6.70 |

Mean values were calculated from the data in the foregoing table for the thickness of the mat in mm when under a load of 10 kPa (1) when the orbit diameter was 1.59 mm; (2) when the orbit diameter was 4.76 mm; (3) when the moisture content of the mat was 25%, (4) when the moisture content of the mat was 50%; and (5) when the moisture content of the mat was 75%. These mean values are plotted in FIG. 7, which indicates that for the data plotted the moisture content of the mat influenced the thickness of the mat after vibration compression more than did the orbit diameter.

The moisture content of the dry-laid mat before it was compressed, and the diameter of the orbit in which the second platen was vibrated are also set forth in the following table, together with the density of the compressed mat, the resistance of the compressed mat to airflow, the tensile strength of the compressed mat and the percent elongation of the compressed mat.

| Sample No. | Density (kg/m³) | Resistance of Airflow (mm H₂O) | Tensile Strength (kg) | Percent Elongation |
|---|---|---|---|---|
| 1 | 126 | 143 | 1.23 | 2.0 |
| 2 | 134 | 169 | 1.81 | 1.8 |
| 3 | 135 | 143 | 1.53 | 1.8 |
| 4 | 131 | 161 | 1.62 | 2.3 |
| 5 | 139 | 181 | 1.81 | 1.6 |
| 6 | 138 | 141 | 1.70 | 1.6 |

The results indicated that about 50% moisture provides superior tensile strength Mean values were calculated from the data in the foregoing table for the tensile strength of the mat in kilograms (1) when the orbit diameter was 1.59 mm; (2) when the orbit diameter was 4.76 mm; (3) when the moisture content of the mat was 25%; (4) when the moisture content of the mat was 50%; and (5) when the moisture content of the mat was 75%. These mean values are plotted in FIG. 8, which indicates that for the data plotted the moisture content of the mat influenced the tensile strength of the mat after vibration compression more than did the orbit diameter, and that the highest tensile strength was achieved when the mat compressed was at a moisture content of 50%.

|  | Compressive Load | | | | | |
|---|---|---|---|---|---|---|
|  | 10.3 kPa | | 20.7 kPa | | 51.7 kPa | |
| Sample No. | % C | % R | % C | % R | % C | % R |
| 1 | 10 | 97.4 | 19 | 95.3 | 40 | 90.9 |
| 2 | 6 | 98.5 | 12 | 97.5 | 30 | 94.1 |
| 3 | 7 | 99.1 | 13 | 98.2 | 31 | 95.5 |
| 4 | 6 | 98.3 | 12 | 97.0 | 31 | 93.4 |
| 5 | 5 | 98.5 | 11 | 97.4 | 29 | 94.2 |
| 6 | 5 | 98.7 | 11 | 97.7 | 28 | 95.5 |

The results from these examples indicate that when a mat is compressed using orbital compression at moisture levels of 25, 50, 75% or dry, the mat will recover to greater than about 90% of its original thickness after being compressed to approximately 29% of its original thickness at a pressure of 51.7 Kpa.

Example 5

Figure 9:
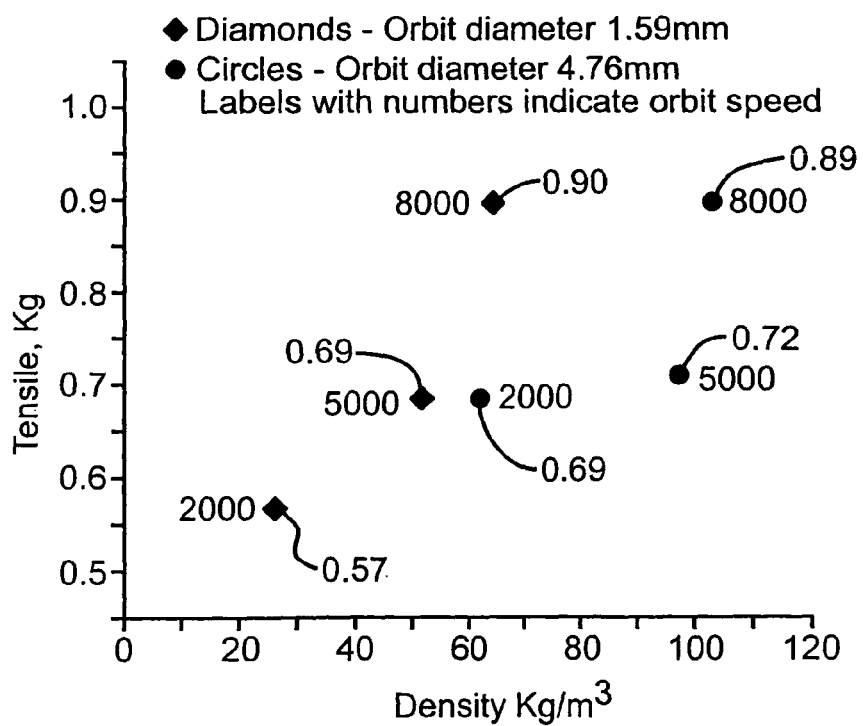
FIG. 9 is a plot of the tensile strength in pounds of several embodiments of vibrationally compressed fiber mats versus the density in $kg/m^3$ of those embodiments.

Effect of Orbit Rate and Diameter on Properties of Vibrationally Compressed Glass Fiber Mats The apparatus described in Example 1 was used to compress glass fiber mats similar to those described in Example 1 differing in that the sample size was 10.2×10.2 cm, using different orbits per minute and different orbit diameters. In all cases, a force of 4.5 kg was used for 20 seconds to cause the second platen to move downwardly. The details of the vibrational and force compressions and the results obtained are summarized in the following table. The results of this example indicated that total compression of a mat increases as orbit diameter and speed increase when used for mats having the listed grammage and thicknesses. Effects on tensile and density are shown in FIG. 9, which indicates that tensile increases with methods using both the 1.59 mm and 4.76 mm orbital rates. As the orbital speed increases, the density of the fiber mat also increases.

| Sample No. | Orbit Diameter (mm) | Orbits Per Minute | Grammage (g/m²) | Density (kg/m³) | Tensile Strength (kg) | Percentage Elongation |
|---|---|---|---|---|---|---|
| 1 | 1.59 | 2000 | 905 | 26 | 0.5 | 4.9 |
| 2 | 4.76 | 2000 | 890 | 62 | 0.7 | 4.1 |
| 3 | 1.59 | 8000 | 853 | 63 | 0.9 | 4.4 |
| 4 | 4.76 | 8000 | 891 | 103 | 0.9 | 3.2 |
| 5 | 1.59 | 5000 | 933 | 51 | 0.7 | 4.8 |
| 6 | 4.76 | 5000 | 894 | 97 | 0.7 | 3.4 |

FIG. 9 is a plot of tensile strength in kilograms versus density in kilograms per cubic meter which is based upon the data in the foregoing table. In FIG. 9, the numbers adjacent the data points indicate the orbital speed used in the vibration compression and the tensile strength in kg; the diamond data points represent values observed when the vibration compression was carried out at an orbit diameter of 1.59 mm; and the circle data points represent values observed when the vibration compression was carried out at an orbit diameter of 4.76 mm.

Example 6

Comparison of Vibration Compression and Hydraulic Compression

The apparatus described in Example 1 was used for vibration compression of glass fiber mats similar to those described in Example 1, differing in that the sample size was 10.2×10.2 cm. In all cases, an orbit diameter of 4.76 mm, 3700 orbits per minute, and a force of 9.06 kg for 20 seconds were used. In some cases the mats compressed were "dry", as produced and in others they were "wet" having been conditioned to a moisture content of 75% based upon the weight of fibers plus water. For purposes of comparison, wet and dry mat samples were also subjected to "hydraulic compression" between the platens of a hydraulic press. The details of the compressions and the results obtained are summarized in the following tables.

| Sample No. | Compression Method | Sample Weight (grams) | Grammage (g/m²) | Thickness (mm @ 10 kPa) |
|---|---|---|---|---|
| 1 (comparative) | dry hydraulic compression | 9.27 | 900 | 4.79 |
| 2 (comparative) | wet hydraulic compression | 13.40 | 870 | 6.56 |
| 3 | dry orbital compression | 9.48 | 920 | 5.78 |
| 4 (comparative) | dry hydraulic compression | 8.84 | 858 | 6.75 |
| 5 (comparative) | wet hydraulic compression | 13.37 | 869 | 6.83 |
| 6 | dry orbital compression | 9.92 | 963 | 6.65 |
| 7 (comparative) | dry hydraulic compression | 9.16 | 889 | 5.35 |
| 8 (comparative) | wet Hydraulic compression | 13.64 | 886 | 6.07 |
| 9 | dry orbital compression | 9.17 | 890 | 5.88 |

As used above, comparative indicates a compression between hydraulic and orbital compression. The hydraulic compression is force excreted on the dry-laid mat until the mat remains at or about a target thickness.

| Sample No. | Density (kg/m³) | Resistance to Airflow (mm H₂O) | Tensile Strength (kg) | Percent Elongation |
|---|---|---|---|---|
| 1 | 90 | ND* | ND* | ND* |
| 2 | 104 | 120 | 0.5 | 2.3 |
| 3 | 138 | 160 | 1.8 | 3.3 |
| 4 | 55 | 0 | 0.3 | 3.2 |
| 5 | 101 | 120 | 0.4 | 2.6 |
| 6 | 126 | 188 | 1.6 | 3.4 |
| 7 | 71 | 0 | 0.00 | 0.0 |
| 8 | 104 | 120 | 0.4 | 2.3 |
| 9 | 130 | 176 | 1.8 | 3.4 |

*not determined due to severe sample degradation following hydraulic compression.

| | Compressive Load | | | | | |
|---|---|---|---|---|---|---|
| | 10.3 kPa | | 20.7 kPa | | 51.7 kPa | |
| Sample No. | % C | % R | % C | % R | % C | % R |
| 1 | 18 | 94.0 | 28 | 90 | 45 | 84.5 |
| 2 | 12 | 97.7 | 22 | 95.8 | 48 | 92.3 |
| 3 | 11 | 98.1 | 18 | 98.2 | 34 | 93.7 |
| 4 | 24 | 94.5 | 36 | 91.0 | 57 | 85.6 |
| 5 | 15 | 97.8 | 25 | 95.4 | 48 | 91.2 |
| 6 | 13 | 97.3 | 20 | 93.3 | 39 | 92.4 |
| 7 | 22 | 95.3 | 33 | 91.7 | 51 | 86.1 |
| 8 | 16 | 96.8 | 25 | 95.0 | 47 | 90.6 |
| 9 | 12 | 99.0 | 19 | 98.0 | 36 | 94.6 |

The data in the foregoing tables of this example demonstrate that vibration compression methods disclosed herein are significantly superior to hydraulic compression in increasing the density and the tensile strength of glass fiber mats.

Example 7

Comparison of Orbital and Straight-Line Vibration

The apparatus described in Example 1 was also used to compress glass fiber mats similar to those described in Example 1 differing in that the sample size was 10.2×10.2 cm. In three cases the vibration of the second platen was orbital, 3700 orbits per minute, orbit diameter of 4.76 mm and in three other cases the vibration was oscillatory, linear movement of 3700 vibrations per minute. In all cases, a force of 9.07 kg was used for 20 seconds to cause the second platen to move downwardly. The grammage, the thickness under a load of 10 kPa, the density, the resistance to air flow, the tensile strength, and the percent elongation of the compressed mats are set forth in the following tables. The data in the following two tables demonstrates that orbital vibration compression is more effective than straight-line vibration compression.

| Sample No. | Vibration | Grammage (g/m²) | Thickness (mm @ 10 kPa) |
|---|---|---|---|
| 1 | Straight line | 891 | 6.25 |
| 2 | Straight line | 872 | 6.42 |
| 3 | Straight line | 867 | 6.46 |
| 4 | Orbital | 920 | 5.78 |
| 5 | Orbital | 963 | 6.65 |
| 6 | Orbital | 890 | 5.88 |

| Sample No. | Density (kg/m³) | Resistance to Airflow (mm H₂O) | Tensile Strength (kg) | Percent Elongation |
|---|---|---|---|---|
| 1 | 126 | 160 | 1.6 | 3.7 |
| 2 | 117 | 146 | 1.5 | 3.2 |
| 3 | 119 | 164 | 1.6 | 3.4 |
| 4 | 138 | 160 | 1.8 | 3.3 |
| 5 | 126 | 188 | 1.6 | 3.4 |
| 6 | 130 | 176 | 1.8 | 3.4 |

The percent that each of the mats produced as described in this example compressed under loads of 10.4 kPa, 20.7 kPa, and 51.7 kPa was determined, as was as the percentage recovery when the compressive load was released. The percentage compression (% C) of each of the mats under the indicated loads is presented in the following table together with the percent recovery (% R) when the load was released. The following tables indicate the differences in compression results between using a straight line vibration motion verses an orbital vibration motion. Both methods compress the mat adequately; however the orbital vibration is more efficient.

| | Compressive Load | | | | | |
|---|---|---|---|---|---|---|
| | 10.3 kPa | | 20.7 kPa | | 51.7 kPa | |
| Sample No. | % C | % R | % C | % R | % C | % R |
| 1 | 13 | 99.7 | 21 | 98.1 | 40 | 94.7 |
| 2 | 13 | 98.0 | 22 | 96.0 | 42 | 90.5 |
| 3 | 12 | 98.2 | 19 | 97.0 | 37 | 92.8 |
| 4 | 11 | 98.1 | 18 | 98.2 | 34 | 93.7 |
| 5 | 13 | 97.3 | 20 | 93.3 | 39 | 92.4 |
| 6 | 12 | 99.0 | 19 | 98.0 | 36 | 94.6 |

Example 8

Vibration Compression Causes Little or No Damage to the Fibers of Compressed Air-Laid Glass Fiber Mats Several samples of glass fiber mat produced in the apparatus of FIG. 1 are compressed to various thicknesses by vibration compression according to the invention between upper and lower platens having major surfaces 10.2×15.2 cm, with coarse sandpaper on the facing surfaces. The lower platen is supported so that it does not move downwardly, and the upper platen is vibrated so that its major surface moves at a speed of about 8000 RPM in a circular path having a diameter of 4.76 mm. Samples of the 10.2×10.2 cm mat, average fiber diameter 0.8 µm, are placed on the lower platen and subjected to vibration compression by urging the vibrating upper platen into contact with stops on the ends of the lower platen, beyond the samples. The upper platen is vibrated, and a force of about 0.9 kg is used to urge the upper platen toward the lower platen; vibration is terminated when the upper platen contacts the stops. Different stops are used so that the distance between the two platens when vibration is terminated varies from test to test, ranging from a minimum of 5 to 6 mm. to as much as about 70 mm. The samples tested are each composed of four mats. Each of the four mats, under no load, has an initial thickness of about 19 mm and weighs about 220 grams per square meter. After vibration, adjacent major surfaces of the four mats are attached to one another as a consequence of the entanglement of fibers of one mat with fibers of another, to form a single mat.

The thickness of the compressed mats is determined under no load and under a load of 10 kPa. The tensile strength of all of the compressed mats that have sufficient integrity such that a determination is possible is also measured. The thickness of each of the compressed mats is found to be approximately the distance between the upper and lower platens when the former is resting on the stops that are used during the vibration compression by which the mat is produced. The tensile strength of the mats that have sufficient integrity such that tensile strength can be measured remains approximately constant. Without being bound by any theory, this is thought to be because vibratory compression of a glass fiber mat increases the extent of intermeshing of the fibers of the mat without causing appreciable fiber breakage so that before and after compression substantially the same numbers of fibers of substantially the same lengths are present to impart strength.

For purposes of comparison, the procedures described in this example are repeated except that the upper platen is not vibrated during compression and a hydraulic cylinder is used to exert a relatively large force on the upper platen to move it into contact with the stops. When the stops are so sized that the distance between the two platens is about 3.8 mm or more when the upper platen is in contact with the stops, the mat returns after compression to approximately its original thickness of about 7.6 mm when the upper platen is raised so that the mat is no longer compressed. On the other hand, when the stops are so sized that the distance between the two platens is less than about 3.8 mm when the upper platen is in contact with the stops the mat returns to a thickness less than about 7.6 mm when the upper platen is raised so that the mat is no longer compressed by the platen. It has been found that the reduced thickness of the mat after compression as just described is attributable to fiber breakage caused by the compression and that the amount of fiber breakage varies as a direct function of the amount by which the thickness to which the mat is compressed is less than about 50% of the original thickness of the mat. It has also been found that the amount by which the thickness of the mat is reduced after compression as just described varies as a direct function of the amount of fiber breakage, and that the tensile strength of the mat varies as an inverse function of the amount of fiber breakage. Accordingly, compression without vibration can be used to increase the density of the mat, but it reduces the tensile strength of the compressed mat and the breakage of the fibers causes other undesirable effects, such as decreased compression/recovery, or tear strength. In addition, the mats tend to fall apart and are difficult to handle.

The data of the foregoing examples demonstrate the use of vibration compression to increase the density of air-laid glass fiber mats with little or no damage to the fibers. Fiber damage, to the extent that it did occur, typically caused reduction of tensile strength. Examples 9 and 10, below, illustrate the use of vibration compression to increase the density of air-laid mats of polypropylene and polyethylene terephthalate fibers.

Example 9

Vibrational Compression of Polypropylene Fiber Mats

Several samples of a melt blown mat of polypropylene fibers are collected without the usual step of increasing the apparent density of the mat by compression while the fibers are in a thermally softened condition. Such polypropylene-fiber mats are compressed to different thicknesses by vibration compression using the apparatus described in Example 1. The polypropylene fibers have an average diameter of substantially 4 μm. The mats are 17 mm thick, weigh 75.9 g/m$^2$, and are approximately 10.2×10.2 cm. The mats are placed on the lower platen that is supported so that it does not move downwardly and are subjected to vibration compression by moving the upper platen downwardly toward the lower platen. The upper platen is vibrated so that its major surface moves at a speed of 8000 RPM in a circular path having a diameter of 4.8 mm, and is urged into contact with stops on the ends of the lower platen, beyond the samples. A force of about 0.9 kg is used to urge the upper platen toward the lower platen; vibration is terminated when the upper platen contacts the stops. Different stops are used so that the distance between the two platens when vibration is terminated ranges from a minimum of 5 to 6 mm. to as much as about 12 mm.

Example 10

Vibrational Compression of Polyethylene Terephthalate Fiber Mats

Several samples of a melt blown mat of polyethylene terephthalate fibers are collected without the usual step of increasing the apparent density of the mat by compression while the fibers are in a thermally softened condition. Such polyethylene terephthalate fiber mats are compressed to different thicknesses by vibration compression using the apparatus described in Example 1. The polyethylene terephthalate fibers have an average diameter of substantially 4 μm. The mats are 17 mm thick, weigh 75.9 g/m$^2$, and are approximately 10.2×10.2 cm. The mats are placed on the lower platen that is supported so that it does not move downwardly and are subjected to vibration compression by moving the upper platen downwardly toward the lower platen. The upper platen is vibrated so that its major surface moves at a speed of about 8000 RPM in a circular path having a diameter of about 4.8 mm, and is urged into contact with stops on the ends of the lower platen, beyond the samples. A force of about 0.9 kg is used to urge the upper platen toward the lower platen; vibration is terminated when the upper platen contacts the stops. Different stops are used so that the distance between the two platens when vibration is terminated ranges from a minimum of 5 to 6 mm. to as much as about 12 mm.

Example 11

Vibrational Compression of Carbon-Fiber Mats

Several samples of a mat of carbon fibers are compressed to different thicknesses by vibration compression using the apparatus described in Example 1. The carbon fibers have an average diameter of substantially 4 μm. Prior to vibrational compression, the carbon-fiber mats are 17 mm thick, weigh 135 g/m$^2$, and are approximately 10.2×10.2 cm. Such mats are produced from a meltblown fabric (grammage about 200 g/m$^2$) composed of fibers of a melt processable polyacrylonitrile polymer residual component and a fugitive polymer component that is a water soluble polyvinyl alcohol by washing the fugitive polyvinyl alcohol polymer from the sheet, and subjecting the remaining polyacrylonitrile fibers to a series of heat treatments to convert them to carbon fibers (see, for example, U.S. Pat. No. 6,583,075).

The carbon-fiber mats are placed on the lower platen that is supported so that it does not move downwardly and are subjected to vibration compression by moving the upper platen downwardly toward the lower platen. The upper platen is vibrated so that its major surfaces move at a speed of 8000 RPM in a circular path having a diameter of 4.8 mm, and is urged into contact with stops on the ends of the lower platen, beyond the samples. A force of about 0.9 kg is used to urge the upper platen toward the lower platen. Vibration is terminated when the upper platen contacts the stops. Different stops are used so that the distance between the two platens when vibration is terminated ranges from a minimum of 5 to 6 mm. to as much as about 12 mm.

Example 12

Vibrational Compression of Wet-Laid Bgo 65 Glass Fiber Separator Material

A sheet of 3 mm thick wet laid glass fiber separator material (commercially available from Hollingsworth & Vose Company, East Walpole, Mass., under the designation "BGO 440 65") were compressed to different thicknesses by vibration compression using the apparatus described in Example 1. The separator material was composed of glass fibers having an average diameter of about 1.4 μm and, prior to vibrational compression, had an average thickness of 3.09 mm and a density of 135.5 kg/m$^3$.

The sheets were placed on the lower platen that was supported so that it did not move downwardly and were subjected to vibration compression by moving the upper platen downwardly toward the lower platen. The upper platen was vibrated so that its major surfaces moved at a speed of about 8000 RPM in a circular path having a diameter of about 4.8 mm, and was urged toward the lower platen with a force of about 27.2 kg. Vibration was terminated after about 20 seconds. After vibration compression, the separator had an average thickness of 2.69 mm under a load of 10 kPa (12.9% decrease), and a density of 164.1 kilograms per m$^3$ (21% increase)

Results similar to those described in the previous paragraph can be achieved by vibration compression of a glass fiber paper produced by depositing a furnish on a wire or screen and draining the furnish. The apparatus comprises a tank with a screen in the bottom, a drain below the screen, a valve that opens and closes the drain and a hand paddle which can be moved back and forth to simulate the movement of a furnish in commercial papermaking apparatus and establish a "machine direction" parallel to the direction of paddle movement. The furnish can be produced by charging to the tank acidified water, pH 2.7, and solids composed of 74.5% w/w Johns Manville's 206 glass fibers, average fiber diameter 0.76 μm, 12.8% w/w Evanite Fiber Corporation's 610 glass fibers, nominal fiber diameter 2.6 μm, and 12.8% w/w Johns Manville A20-BC-13 mm glass fibers, nominal fiber diameter 13 μm, and stirring for about five minutes. Thereafter, the valve is opened so that the water drains through the screen while the separator is retained on the screen. The furnish can contain enough glass fibers to produce a separator having an average thickness of 3.09 mm under a load of 10 kPa, and a density of 135.5 kg/m$^3$.

Example 13

Vibrationally Compressed Wet-Laid Fiberboard Insole

This example describes vibrational compression of a wet-laid fiberboard insole. Fiberboard insole is produced on a cylinder machine (sometimes called a "rotoformer") from a slurry comprised of recycled corrugated sheets and ground kraft fibers from flour and sugar bags, as known to those of ordinary skill in the art. The slurry is pulped and refined to a Canadian Standard freeness of 80 cc, and is charged to the rotoformer. A sheet picked up from the slurry by the cylinder of the rotoformer is wound on a making roll until a web about 6.4 mm in thickness is collected. The web is then cut from the making roll and subjected to vibration compression.

The vibration compression step is carried out between opposed platens with roughened facing surfaces, by mounting the lower one of the opposed platens so that it does not move downwardly, placing the web on the lower platen, and urging the upper one of the platens downwardly against the upper surface of the web while causing the upper platen to vibrate so that its major surfaces move at a speed of about 8000 RPM in a circular path having a diameter of 4.8 mm. A force of about 13.8 kPa is used to urge the upper platen downwardly. The web is subject to vibrational compression for about 5 to about 30 seconds. The compressed material is then sent through an air tunnel dryer for about an hour and is slit to narrower sheets, allowed to temper for moisture control and finished by calendar to the final targeted thickness.

While this disclosure has been described with an emphasis upon particular embodiments, it will be obvious to those of ordinary skill in the art that variations of the particular embodiments may be used and it is intended that the disclosure may be practiced otherwise than as specifically described herein. Accordingly, this disclosure includes all modifications encompassed within the spirit and scope of the disclosure as defined by the following claims:

We claim:
1. A fiber mat comprising:
 a plurality of glass fibers having an average diameter of from 0.2 μm to 30 μm, and being randomly entangled with one another such that the glass fibers physically contact one another at points of intersection and forming a dry-laid fiber web;
 the dry-laid fiber web being substantially binder free and wherein the glass fibers are not fused at the points of intersection;
 the fiber mat having a density of at least 60 kg/m$^3$, the density being measured when the fiber mat is dry; and
 wherein the fiber mat has not been hydro-entangled or needle-punched.
2. The fiber mat of claim 1 wherein the fiber mat has a density of at least 100 kg/m$^3$.
3. The fiber mat of claim 1 wherein the fiber mat has a density of at least 120 kg/m$^3$.
4. The fiber mat of claim 1 wherein the fiber mat has a density of at least 175 kg/m$^3$.
5. The fiber mat of claim 4 wherein the fiber mat is flexible such that the fiber mat does not crack when flexed 180° when having a thickness of 6 mm.
6. The fiber mat of claim 1 wherein the fiber mat has a density of at least 200 kg/m$^3$.
7. The fiber mat of claim 1 further comprising glass fibers mixed with polyolefin, polyethylene terephthalate, carbon, acrylic, polyphenylene sulfide, or cellulose fibers and mixtures thereof.
8. The fiber mat of claim 1 further comprising glass fibers mixed with natural or synthetic organic fibers and mixtures thereof.
9. The fiber mat of claim 1 wherein the glass fibers have an average diameter of from 0.2 μm to 10 μm.
10. The fiber mat of claim 1 wherein the fiber mat has a tensile strength of at least 0.45 Kg.
11. The fiber mat of claim 1 wherein the fiber mat has a tensile strength of at least 1.1 Kg.
12. The fiber mat of claim 1 wherein the fiber mat has been vibrationally compressed.
13. The fiber mat of claim 1 wherein the fiber mat has been orbitally vibrationally compressed.
14. A fiber mat comprising:
 a plurality of glass fibers having an average diameter of from 0.2 μM to 30 μm, and being randomly entangled with one another such that the glass fibers physically contact one another at points of intersection, without bonding at such points, and forming a dry-laid fiber web;
 the dry-laid fiber web being substantially binder free and having a tensile strength of at least 1.1 kg for mats of a thickness of 6 mm;
 the fiber mat having a density of at least 60 kg/m$^3$, the density being a ratio of the mass of the glass fibers to the volume of the fiber web; and wherein the fiber mat has not been hydro-entangled or needle-punched.

15. A dry-laid mat of fibers comprising:

a plurality of fibers having diameters of from 0.2 μm to 30 μm;

the fibers being randomly entangled with one another such that the glass fibers physically contact one another at points of intersection and forming a fiber web, the fiber web having a first thickness;

the fiber web being substantially binder-free, the fiber web forming the dry-laid fiber mat; and the dry-laid fiber mat having a density of at least 60 kg/m$^3$ without having been subjected to hydro-entanglement or needle-punching processes and having a thickness percentage recovery of at least 90% of its first thickness after being pressed under 51.7 KPa of pressure to 35% of the first thickness.

16. The dry-laid mat of fibers of claim 15, wherein the fibers comprise glass fibers.

17. The fiber mat of claim 15 wherein the fibers of the dry-laid fiber mat are not bonded to one another at the points of intersection of the fibers.

18. The fiber mat of claim 15, wherein the fiber mat has a density of at least 200 kg/m$^3$.

19. A non-hydroentangled, non-needle-punched fiber mat comprising:

a plurality of glass fibers having an average diameter of from 0.2 μm to 30 μm and being randomly entangled with one another such that the glass fibers physically contact one another at points of intersection and forming a dry-laid fiber web;

the dry-laid fiber web being substantially binder-free and wherein the fiber web is flexible such that the fiber web when having a thickness of 6 mm does not incur substantial breakage when flexed 180°;

the fiber web having a density of at least 100 kg/m$^3$; and wherein the fiber web has been vibrationally compressed.

20. The fiber mat of claim 19 wherein the fiber web has a density of at least 200 kg/m$^3$.

* * * * *